US008937268B2

(12) United States Patent
Kuriki

(10) Patent No.: US 8,937,268 B2
(45) Date of Patent: Jan. 20, 2015

(54) CONDUCTIVE FILM AND TRANSPARENT HEATING ELEMENT

(75) Inventor: Tadashi Kuriki, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 735 days.

(21) Appl. No.: 12/993,475

(22) PCT Filed: May 15, 2009

(86) PCT No.: PCT/JP2009/059046
§ 371 (c)(1),
(2), (4) Date: Dec. 27, 2010

(87) PCT Pub. No.: WO2009/142150
PCT Pub. Date: Nov. 26, 2009

(65) Prior Publication Data
US 2011/0089160 A1    Apr. 21, 2011

(30) Foreign Application Priority Data

May 19, 2008  (JP) .................................. 2008-131310
Dec. 22, 2008  (JP) .................................. 2008-326512

(51) Int. Cl.
*H05B 3/10*  (2006.01)
*H05B 3/84*  (2006.01)

(52) U.S. Cl.
CPC ............ *H05B 3/84* (2013.01); *H05B 2203/002* (2013.01)
USPC ............ 219/553; 219/528; 219/548; 219/549

(58) Field of Classification Search
USPC ......... 219/203, 522, 528, 549, 543, 529, 544, 219/211, 553
See application file for complete search history.

(56) References Cited

U.S. PATENT DOCUMENTS 2,932,710 A  *  4/1960   Coale et al. .................... 219/547
3,729,616 A  *  4/1973   Gruss et al. .................... 219/522
3,778,898 A  * 12/1973   Gruss et al. ..................... 29/611
3,795,472 A  *  3/1974   Gruss et al. .................... 425/517
(Continued)

FOREIGN PATENT DOCUMENTS

EP        0364247       4/1990
FR        2821937       9/2002
(Continued)

OTHER PUBLICATIONS

Machine translation of WO2008/020141 A1, accessed May 4, 2013.*
(Continued)

*Primary Examiner* — Dana Ross
*Assistant Examiner* — Renee L Miller
(74) *Attorney, Agent, or Firm* — Young & Thompson

(57) ABSTRACT

Provided is a conductive film suitable for use in a transparent heating element having superior visibility and heat generation properties. A conductor of a first conductive film has a mesh pattern which has a plurality of lattice cross points (intersections) formed by a plurality of first metal nanowires and a plurality of second metal nanowires. The conductor between intersections is formed in a wave-like shape having at least one curve. The array period of an arc of one first metal nanowire from among parallel adjacent first metal nanowires is one period. The array period of an arc of another first metal nanowire constitutes two periods. Similarly, the array period of an arc of one second metal nanowire is one period. The array period of an arc of another second metal nanowire constitutes two periods.

28 Claims, 31 Drawing Sheets

(56) References Cited

U.S. PATENT DOCUMENTS

| | | |
|---|---|---|
| 3,947,837 A | 3/1976 | Bitterice |
| 4,772,760 A | 9/1988 | Graham |
| 6,937,380 B2 | 8/2005 | Fanton et al. |
| 7,626,128 B2 | 12/2009 | Takada et al. |
| 2003/0099842 A1 | 5/2003 | Za-Gdoun et al. |
| 2004/0100676 A1 | 5/2004 | Fanton et al. |
| 2004/0229028 A1 | 11/2004 | Sasaki et al. |
| 2009/0128893 A1* | 5/2009 | McCarthy et al. ............ 359/352 |
| 2010/0200286 A1 | 8/2010 | Melcher et al. |

FOREIGN PATENT DOCUMENTS

| | | |
|---|---|---|
| JP | 10-289602 | 10/1998 |
| JP | 2000-114770 | 4/2000 |
| JP | 2000-114773 | 4/2000 |
| JP | 2003-531094 | 10/2003 |
| JP | 2004-221565 | 8/2004 |
| JP | 2005-197234 | 7/2005 |
| JP | 2006-190585 | 7/2006 |
| JP | 2007-026989 | 2/2007 |
| JP | 2008-060557 | 3/2008 |
| JP | 2008-077879 | 4/2008 |
| WO | WO2006/040989 | 4/2006 |
| WO | WO2008020141 | 2/2008 |

OTHER PUBLICATIONS

International Search Report, PCT/JP2009/059046, Aug. 9, 2009.

Japanese Official Action—2008-326512—Jul. 30, 2013.

* cited by examiner

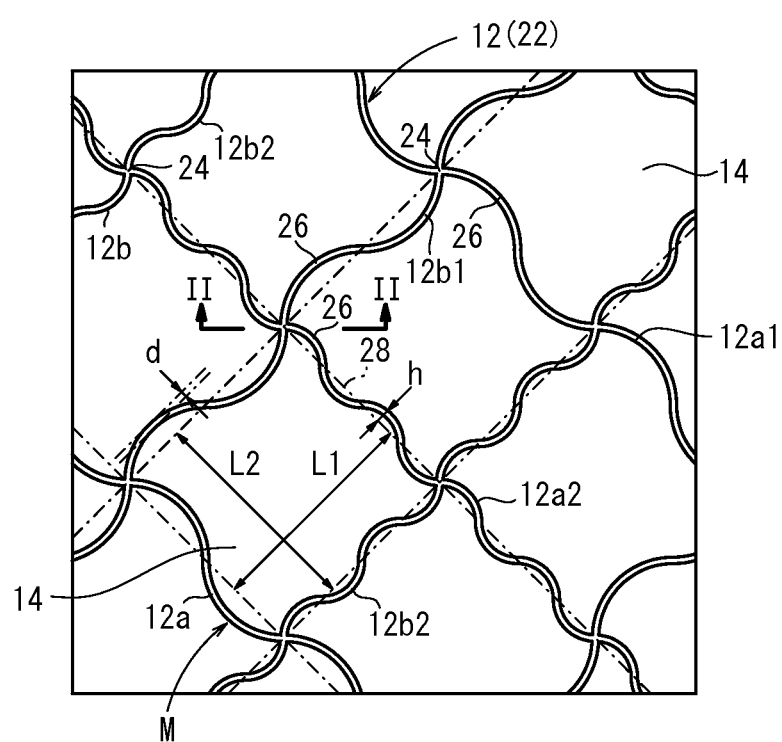
FIG. 1
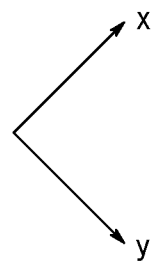

100

200

CONDUCTIVE FILM AND TRANSPARENT HEATING ELEMENT

TECHNICAL FIELD

The present invention relates to a conductive film that can be used as a part of a defroster (defrosting device) or a window glass for a vehicle, as a heating sheet for heat generation by applying electric current, or as an electrode for a touch panel, an inorganic EL device, an organic EL device, or a solar cell, and to a transparent heating element containing the conductive film.

BACKGROUND ART

A device described in Japanese Laid-Open Patent Publication No. 2005-197234 has recently been proposed as an electroluminescence device capable of large-area (e.g., 0.25 $m^2$ or more) light emission with high luminance and long lifetime.

Meanwhile, structures described in Japanese Laid-Open Patent Publication Nos. 2007-026989 and 10-289602 have been known as a vehicle light containing a conductive film capable of preventing illuminance reduction of the light.

The illuminance of a vehicle light may be reduced due to the following causes:
(1) adhesion and accumulation of snow on the circumferential surface of the front cover,
(2) adhesion and freezing of rain water or car wash water on the circumferential surface of the front cover, and
(3) progression of (1) and (2) due to use of an HID lamp light source having a high light intensity even under low power consumption (a small heat generation amount).

The structure described in Japanese Laid-Open Patent Publication No. 2007-026989 is obtained by attaching a heating element containing a transparent insulating sheet and a conductive pattern printed thereon to a formed lens using an in-mold method. Specifically, the conductive pattern of the heating element is composed of a composition containing a noble metal powder and a solvent-soluble thermoplastic resin.

The structure described in Japanese Laid-Open Patent Publication No. 10-289602 is obtained by attaching a heating element to a lens portion in the vehicle lamp. The lens portion is heated by applying an electric field to the heating element under a predetermined condition. The document describes that the heating element comprises a transparent conductive film of ITO (Indium Tin Oxide), etc.

Furthermore, a device described in Japanese Laid-Open Patent Publication No. 2006-190585 has been proposed as a dye-sensitized solar cell capable of reducing adverse effects of reflected electromagnetic waves without significant reduction of the power generation efficiency. In addition, in the field of electromagnetic-shielding films, Japanese Laid-Open Patent Publication No. 2004-221565 has disclosed a technology for limiting a thickening ratio of line intersections in a mesh to minimize PDP image quality deterioration due to moire or the like.

SUMMARY OF INVENTION

In the heating element described in Japanese Laid-Open Patent Publication No. 2007-026989, one conductive wire may be arranged in a zigzag manner on a headlamp front cover or the like to form a long conductive line in view of obtaining a desired resistance value (e.g., about 40 ohm). However, a potential difference may be disadvantageously generated between adjacent conductive line portions to cause migration.

In the heating element described in Japanese Laid-Open Patent Publication No. 10-289602, the transparent conductive film of ITO, etc. is used. The film cannot be formed on a curved surface of a formed body by a method other than vacuum sputtering methods. Thus, the heating element is disadvantageous in efficiency, cost, etc.

In addition, since the transparent conductive film is composed of a ceramic such as ITO, the film may be cracked when bent in an in-mold method. Therefore, the film can hardly be used in a vehicle light front cover or the like having the curved-surface body and the transparent heater though it can be used in a window glass with relatively less curved surface.

Thus, the conventional heating elements are less versatile and exclusively used in a vehicle light front cover, a window glass, etc.

In the case of using a conductive film as an electrode of a touch panel, an inorganic EL device, or an organic EL device, a conductive portion has to be formed in view of light refraction and diffraction in the portion to prevent glare caused by a backlight, etc.

The solar cell described in Japanese Laid-Open Patent Publication No. 2006-190585 utilizes a transparent conductive film of ITO, etc., thereby resulting in the same problems as Japanese Laid-Open Patent Publication No. 10-289602. Also the electromagnetic-shielding film technology described in Japanese Laid-Open Patent Publication No. 2004-221565 still has room for improvement.

Under such circumstances, an object of the present invention is to provide a conductive film and a transparent heating element usable as a heating sheet for heat generation by applying electric current, which can exhibit an improved heat generation efficiency, can prevent glare caused by a vehicle or outdoor light, and can be versatilely used in a vehicle light front cover, a window glass, etc.

Another object of the present invention is to provide a conductive film that can be used as an electrode of a touch panel, an inorganic EL device, or an organic EL device to prevent glare or the like caused by a backlight.

A further object of the present invention is to provide a conductive film that can be used as an electrode of a solar cell to shield electromagnetic waves and to lower the surface resistance without reduction of the power generation efficiency.

For the purpose of realizing a highly versatile transparent heating element usable for a vehicle light front cover, a building window glass, a vehicle window glass, etc., the inventor has examined a conductive film according to a comparative example having a plurality of conductive portions and a plurality of opening portions, which provide mesh shapes in combination. Specifically, the conductive portions are formed in a straight line shape and are crossed to form the mesh shapes.

When the heating wire is arranged in a zigzag manner in the conventional structure, a potential difference is generated between the adjacent conductive line portions to cause migration disadvantageously. In contrast, when the conductive portions are formed in the mesh shapes, the adjacent conductive portions are intrinsically in the short circuit condition, and the migration is never a problem.

The conductive portions can be composed of a thin metal wire or the like excellent in malleability and ductility, and therefore can be formed along a three-dimensional curved surface having a minimum curvature radius of 300 mm or less.

However, it has been found that in the conductive film according to the comparative example, diffracted lights generated in the ends of the straight conductive portions interact with each other in diffraction points arranged linearly on the intersections to emit an intense interfering light. Also on the conductive portions, diffraction points are arranged linearly to emit an intense light, though the light is weaker than the interfering light from the intersections. Therefore, when the conductive film is incorporated in a window glass, significant glare or the like is disadvantageously caused due to the interference of the diffracted lights.

Thus, in the present invention, the problem has been solved by using the following structure.

[1] A conductive film according to a first aspect of the present invention comprising a plurality of conductive portions and a plurality of opening portions, wherein the combination of the conductive portions and the opening portions has mesh shapes, the conductive portions are formed of a plurality of conductive thin metal wires in a mesh pattern having a plurality of lattice intersections, and some of the conductive thin metal wires are formed in a wavy line shape containing arcs extending in alternate directions, at least one of the arcs being disposed between the intersections.

In this structure, diffraction points are not arranged linearly on the intersections of the conductive portions not having a straight section, and an interfering light from the intersections has a low intensity. The same phenomenon is caused on the conductive portions, and also an interfering light from the conductive portions has a low intensity. In the present invention, the mesh shapes can reduce glare or the like caused by the interference of the diffracted lights. Therefore, the conductive film is suitable for a transparent heating element to be incorporated in a window glass (such as a building window glass or a vehicle window glass), a vehicle light front cover, etc. The straight section may be appropriately formed if necessary depending on the product using the conductive film (such as the window glass or the vehicle light front cover), the period or amplitude of the wavy line shape, etc.

Furthermore, when the conductive film of the present invention is used as an electrode of a touch panel, an inorganic EL device, or an organic EL device, the conductive film can prevent glare or the like caused by a backlight and thus visibility deterioration of a displayed image.

Furthermore, when the conductive film is used as an electrode of a solar cell, the conductive film can act as an electromagnetic-shielding film and can exhibit a low surface resistance to prevent reduction of power generation efficiency.

[2] A conductive film according to the first aspect, wherein the mesh pattern is formed by crossing a plurality of first thin metal wires arranged in one direction and a plurality of second thin metal wires arranged in another direction.

[3] A conductive film according to the first aspect, wherein the arcs have a central angle of 75° to 105° (preferably approximately 90°).

[4] A conductive film according to the first aspect, wherein at least the first thin metal wires are formed in wavy line shapes containing at least one curve between the intersections, and the wavy line shapes of adjacent parallel first thin metal wires have different periods.

[5] A conductive film according to the first aspect, wherein among adjacent parallel first thin metal wires, one first thin metal wire is formed in a straight line shape, and the other first thin metal wire is formed in a wavy line shape containing at least one curve between the intersections.

[6] A conductive film according to the first aspect, wherein the second thin metal wires are formed in wavy line shapes containing at least one curve between the intersections, and the wavy line shapes of adjacent parallel second thin metal wires have different periods.

[7] A conductive film according to the first aspect, wherein among adjacent parallel second thin metal wires, one second thin metal wire is formed in a straight line shape, and the other second thin metal wire is formed in a wavy line shape containing at least one curve between the intersections.

[8] A conductive film according to the first aspect, wherein the arcs have a central angle of 90°, and the number of the arcs on the circumference line of each mesh shape is 2k (k=1, 2, 3, . . . ).

[9] A conductive film according to the first aspect, wherein the arcs have a central angle of 90°, and the number of the arcs on the circumference line of each mesh shape is 4k (k=1, 2, 3, . . . ).

[10] A conductive film according to the first aspect, wherein in a line connecting the central points of optional adjacent two mesh shapes disposed along the arrangement of the intersections of the conductive portions, the length of a first line segment connecting the central point of one mesh shape and the intersection is equal to the length of a second line segment connecting the central point of the other mesh shape and the intersection.

[11] A conductive film according to the first aspect, wherein in a line connecting the central points of optional adjacent two mesh shapes disposed along the extending direction of one conductive portion, the length of a third line segment connecting the central point of one mesh shape and another conductive portion is equal to the length of a fourth line segment connecting the central point of the other mesh shape and the other conductive portion.

[12] A conductive film according to the first aspect, wherein at least one of a pattern of the first thin metal wires a pattern of the second thin metal wires is set such that, calling one thin metal wire having a smallest arrangement period number of the arcs a number-one first thin metal wire, the arrangement period number of the arcs is increased stepwise from the number-one thin metal wire to another thin metal wire arranged in one direction.

[13] A conductive film according to the first aspect, wherein at least one of a pattern of the first thin metal wires and a pattern of the second thin metal wires is set such that two thin metal wires disposed adjacently on either side of a thin metal wire having a smallest arrangement period number of the arcs have approximately the same arrangement period numbers of the arcs, and two thin metal wires disposed adjacently on either side of a thin metal wire having a largest arrangement period number of the arcs have approximately the same arrangement period numbers of the arcs.

[14] A conductive film according to the first aspect, wherein the conductive portions have a crossing angle of approximately 90° in the intersections.

[15] A conductive film according to the first aspect, wherein the conductive portions contain a metallic silver portion formed by exposing and developing a photosensitive silver salt layer disposed on a transparent support.

[16] A transparent heating element according to a second aspect of the present invention comprising a conductive film according to the first aspect.

As described above, when the conductive film or the transparent heating element of the present invention is used as a heating sheet for heat generation by applying electric current, it can exhibit an improved heat generation efficiency, can prevent glare caused by a vehicle or outdoor light, and can be versatilely used in a vehicle light front cover, a window glass, etc.

When the conductive film of the present invention is used as an electrode of a touch panel, an inorganic EL device, or an organic EL device, glare or the like caused by a backlight can be prevented.

When the conductive film of the present invention is used as an electrode of a solar cell, it can act as an electromagnetic-shielding film and can exhibit a low surface resistance to prevent reduction of the power generation efficiency.

BRIEF DESCRIPTION OF DRAWINGS

FIG. 1 is a plan view partially showing a first conductive film;

DESCRIPTION OF EMBODIMENTS

Several embodiments of the conductive film and the transparent heating element of the present invention will be described below with reference to FIGS. 1 to 31.

As shown in FIG. 1, a conductive film according to a first embodiment (hereinafter referred to as the first conductive film 10A) contains a plurality of conductive portions 12 and a plurality of opening portions 14, and the combination of the conductive portions 12 and the opening portions 14 has mesh shapes M. Each mesh shape M is a combined shape of one opening portion 14 and four conductive portions 12 surrounding the opening portion 14.

Figure 2:
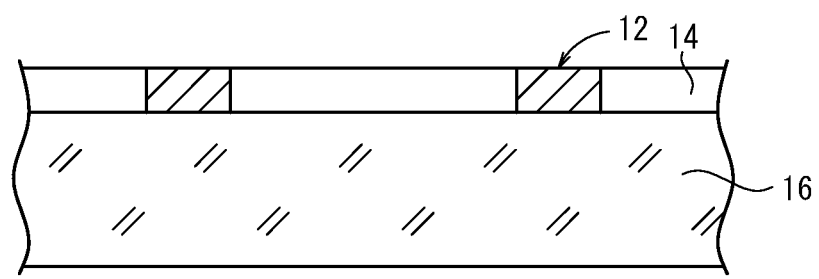
FIG. 2 is a cross-sectional view taken along the II-II line of FIG. 1.
Figure 3:
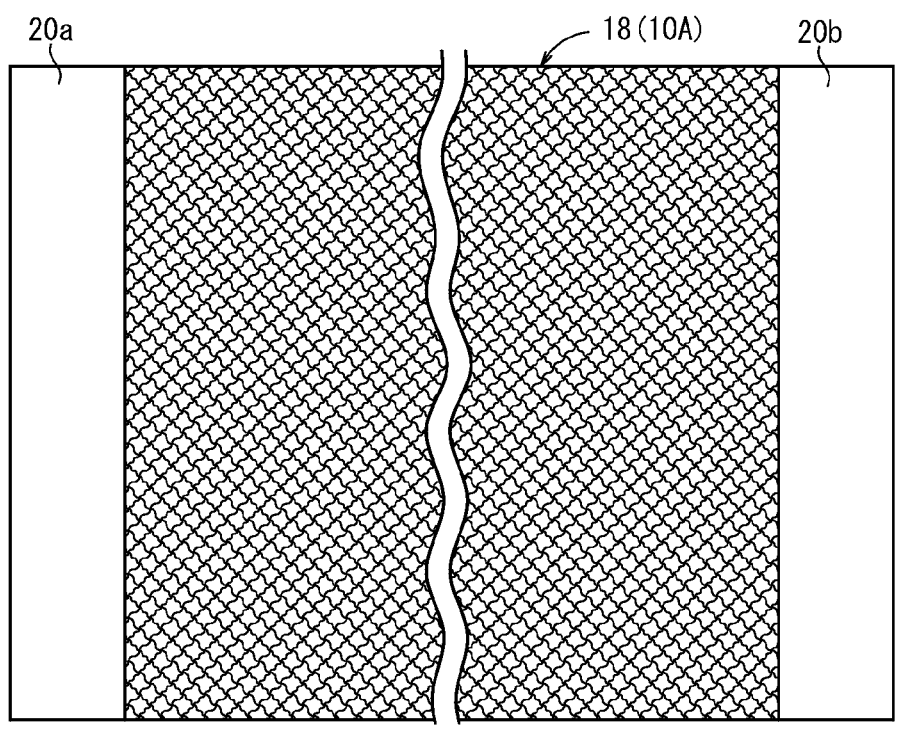
FIG. 3 is a plan view showing an example structure of a transparent heating element using the first conductive film.

The first conductive film 10A can be used as a part of a defroster (defrosting device) or a window glass for a vehicle. The first conductive film 10A can be used also in a transparent heating element capable of heat generation by applying electric current. As shown in FIG. 2, the first conductive film 10A has a transparent film substrate 16, and the conductive portions 12 and the opening portions 14 formed thereon. As shown in FIG. 3, when the first conductive film 10A is used in a transparent heating element 18, a first electrode 20a and a second electrode 20b are disposed on the opposite ends of the first conductive film 10A (e.g., the right and left ends of FIG. 3). When an electric current is flowed from the first electrode 20a to the second electrode 20b, the transparent heating element 18 generates heat. Thus, a heating object (such as a building window glass, a vehicle window glass, or a vehicle light front cover), which is brought into contact or equipped with the transparent heating element 18, is heated. As a result, snow or the like attached to the object can be removed.

As shown in FIG. 1, the conductive portions 12 in the first conductive film 10A have a mesh pattern 22 formed by crossing a plurality of first thin metal wires 12a arranged at a first pitch L1 in one direction (the x direction of FIG. 1) and a plurality of second thin metal wires 12b arranged at a second pitch L2 in another direction (the y direction of FIG. 1). The first pitch L1 and the second pitch L2 may be selected within a range of 150 μm to 6000 μm (6.0 mm). The line width d of the first thin metal wires 12a and the second thin metal wires 12b may be selected within a range of 5 μm to 200 μm (0.2 mm). It is to be understood that the line width d may be selected within a range of 5 to 50 μm to improve the transparency.

Thus, the conductive portions 12 are formed of the plural first thin metal wires 12a and the plural second thin metal wires 12b in the mesh pattern 22 having a large number of lattice intersection points (intersections 24). Each of the conductive portions 12 is formed in a wavy line shape containing at least one curve between the intersections 24.

Specifically, among the plural first thin metal wires 12a, each alternate first thin metal wire 12a1 (one first thin metal wire 12a1) has a shape with arc-shaped curves, and two arcs 26 extending in alternate crest and trough directions are continuously formed between the intersections 24. Among the plural first thin metal wires 12a, each first thin metal wire 12a2 other than the first thin metal wires 12a1 (the other first thin metal wire 12a2) has a shape with arc-shaped curves, and four arcs 26 extending in alternate crest and trough directions are continuously formed between the intersections 24.

In terms of the arrangement period of the arcs 26, the length, in which two arcs 26 extending in alternate crest and trough directions are continuously formed, is considered as 1 period. Then, the one first thin metal wire 12$a$1 have 1 period of the arcs between the intersections, and the other first thin metal wires 12$a$2 have 2 periods of the arcs between the intersections.

Thus, in the first conductive film 10A, the adjacent parallel first thin metal wires 12$a$ (the one first thin metal wire 12$a$1 and the other first thin metal wire 12$a$2) have different arc arrangement periods.

Also among the second thin metal wires 12$b$, one second thin metal wires 12$b$1 have 1 period of the arcs between the intersections 24, and the other second thin metal wires 12$b$2 have 2 periods of the arcs between the intersections 24.

It is to be understood that, when the one first thin metal wire 12$a$1 has i period of the arcs between the intersections 24, the other first thin metal wire 12$a$2 has j period of the arcs between the intersections 24, the one second thin metal wire 12$b$1 has p period of the arcs between the intersections 24, and the other second thin metal wire 12$b$2 has q period of the arcs between the intersections 24, the periods may satisfy one of the following relations.

(1) $i \neq j$, $i = p$, $j = q$
(2) $i \neq p$, $i \neq p$, $j = q$, $p \neq q$
(3) $i \neq j$, $i = p$, $j \neq q$, $p \neq q$
(4) $i \neq j$, $i \neq p$, $j \neq q$, $p \neq q$ Each arc 26 has a central angle of 75° to 105°, preferably approximately 90°. The conductive portions 12 have a crossing angle of approximately 90°. Though the preferred central angle and the preferred crossing angle are represented by the term "approximately 90°" in view of production tolerance, it is desired that the central angle and the crossing angle are ideally 90°. The 1 period is preferably 50 to 2000 µm.

The wavy line shape of each conductive portion 12 has a constant amplitude h. When an imaginary line 28 connects two adjacent intersections 24 and a line perpendicular to the imaginary line 28 extends from a crest of the wavy line shape, the amplitude h is a distance from the crest to the intersection point of the perpendicular line and the imaginary line 28. The amplitude h is preferably 10 to 500 µm. Though the conductive portion 12 has the wavy line shape with the constant amplitude h in this embodiment, adjacent two arcs 26 between the intersections 24 may have different amplitudes, and the adjacent parallel wavy line shapes may have different arc amplitudes.

Figure 4:
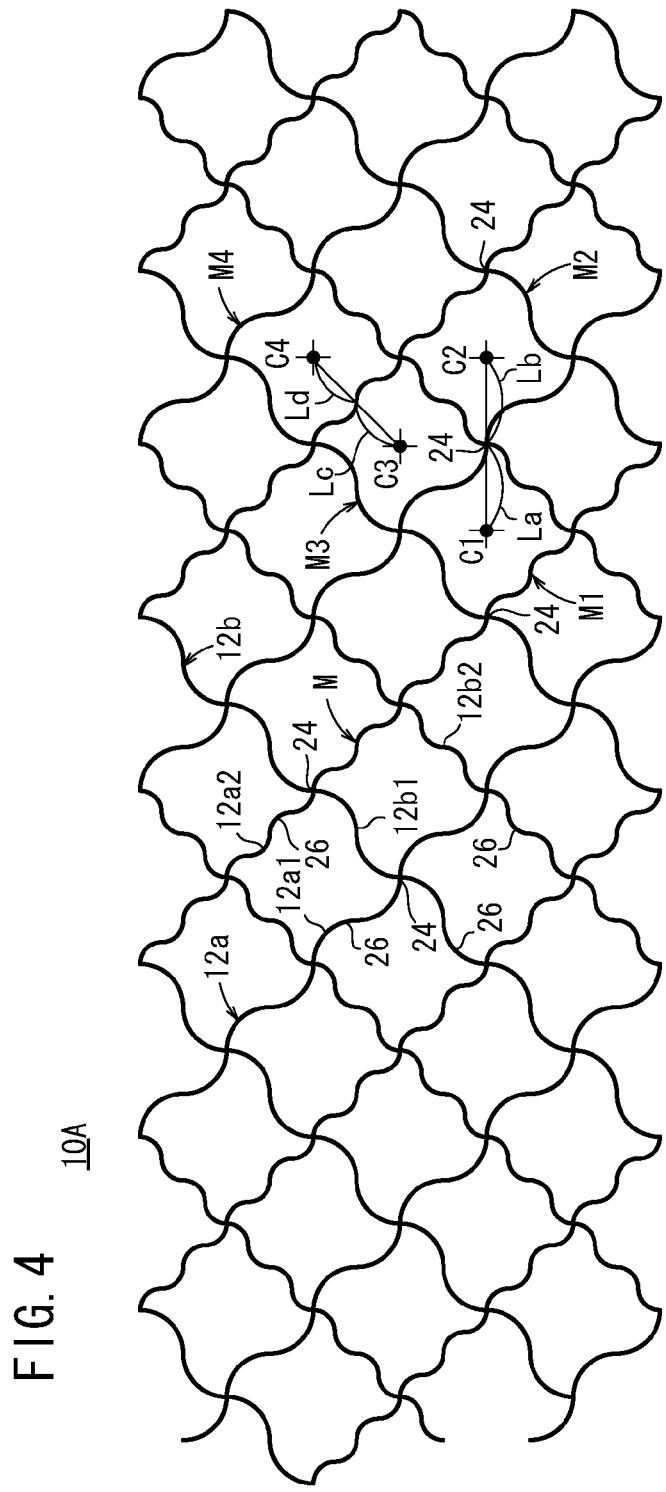
FIG. 4 is an explanatory view schematically showing a mesh pattern of the first conductive film.

As schematically shown in FIG. 4, in the first conductive film 10A, in a line connecting the central points C1 and C2 of optional adjacent two mesh shapes M1 and M2 disposed along the arrangement of the intersections 24, the length La of a first line segment connecting the central point of one mesh shape M1 and the intersection 24 is equal to the length Lb of a second line segment connecting the central point of the other mesh shape M2 and the intersection 24.

Furthermore, as shown in FIG. 4, in a line connecting the central points C3 and C4 of optional adjacent two mesh shapes M3 and M4 disposed along the extending direction of the second thin metal wire 12$b$, the length Lc of a third line segment connecting the central point C3 of one mesh shape M3 and the first thin metal wire 12$a$ is equal to the length Ld of a fourth line segment connecting the central point C4 of the other mesh shape M4 and the first thin metal wire 12$a$.

The first conductive film 10A has a total light transmittance of 70% or more but less than 99%, which can be increased to 80% or more or 85% or more.

Thus, in the first conductive film 10A, the conductive portions 12 hardly have a straight section, so that diffraction points are not arranged linearly on the intersections 24 of the conductive portions 12. In addition, the adjacent parallel thin metal wires are formed in the wavy line shapes with different periods, whereby the diffraction points are discretely distributed to further reduce glare or the like caused by interference of diffracted lights.

Thus, an interfering light from the intersections 24 has a low intensity, and also an interfering light from the conductive portions 12 has a low intensity. The glare or the like caused by the interference of diffracted lights is thus prevented that would otherwise be caused by the mesh shapes.

Furthermore, since the first thin metal wires 12$a$ are arranged at the first pitch L1 and the second thin metal wires 12$b$ are arranged at the second pitch L2 in the first conductive film 10A, the opening portions 14 have approximately constant opening areas, whereby the glare or the like caused by the interference of diffracted lights can be prevented on the whole surface, and significant glare or the like is not caused locally.

Therefore, the first conductive film 10A is suitable for the transparent heating element 18, which can be incorporated in a window glass (such as a building window glass or a vehicle window glass), a vehicle light front cover, etc. The straight section may be appropriately formed in the wavy line shape if necessary depending on the product (such as the window glass or the vehicle light front cover), the period or amplitude of the wavy line shape, etc. The wavy line shape may be a sine wave curve shape.

In the first conductive film 10A, the number of the arcs 26 on the circumference line of one mesh shape M is 4k (k=1, 2, 3, . . . ). Therefore, the first conductive film 10A is capable of exhibiting a low overall surface resistance, improving heat generation efficiency in a transparent heating element, and improving power generation efficiency in a solar cell.

Figure 5:
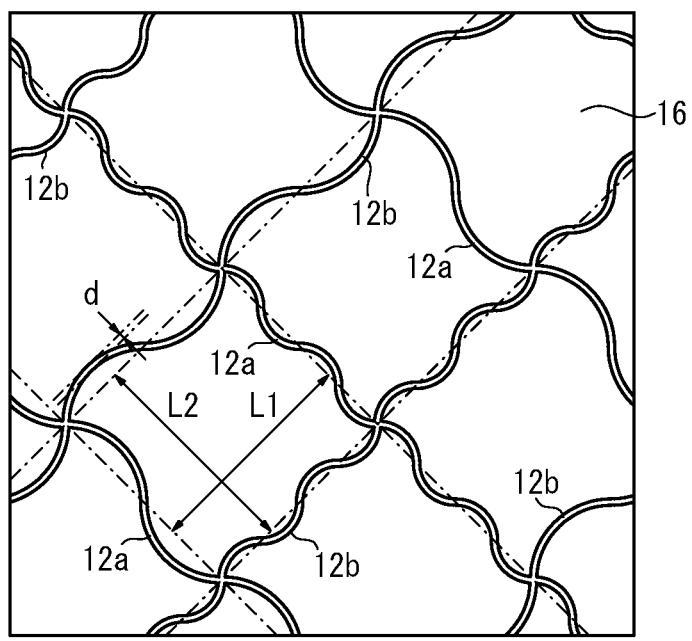
FIG. 5 is a front view showing a product using the first conductive film (a first conductive sheet)
Figure 6:
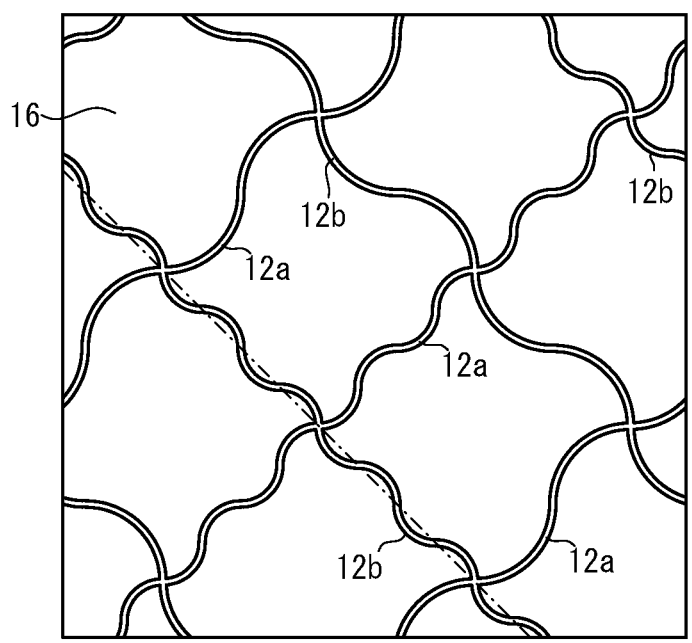
FIG. 6 is a back view showing the first conductive sheet.
Figure 7:
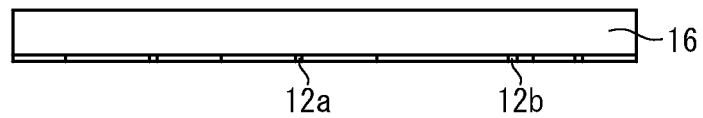
FIG. 7 is a top view showing the first conductive sheet.
Figure 8:
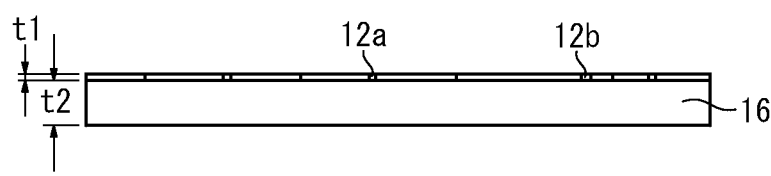
FIG. 8 is a bottom view showing the first conductive sheet.
Figure 9:
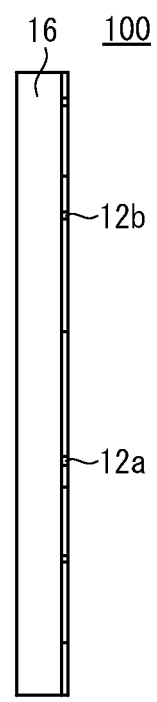
FIG. 9 is a left side view showing the first conductive sheet.
Figure 10:
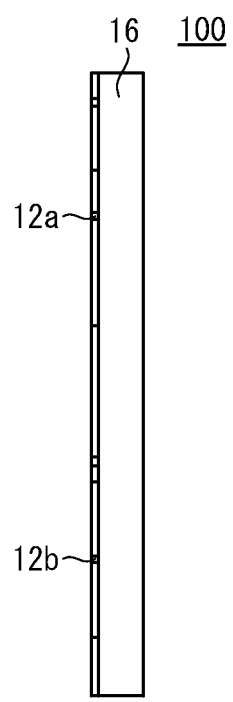
FIG. 10 is a right side view showing the first conductive sheet.
Figure 11:
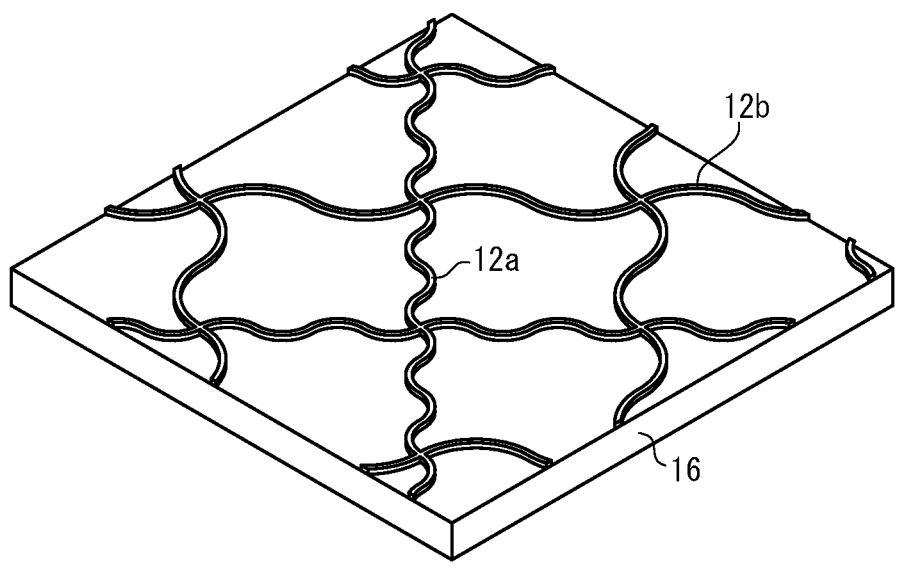
FIG. 11 is a perspective view showing the first conductive sheet.
Figure 12:
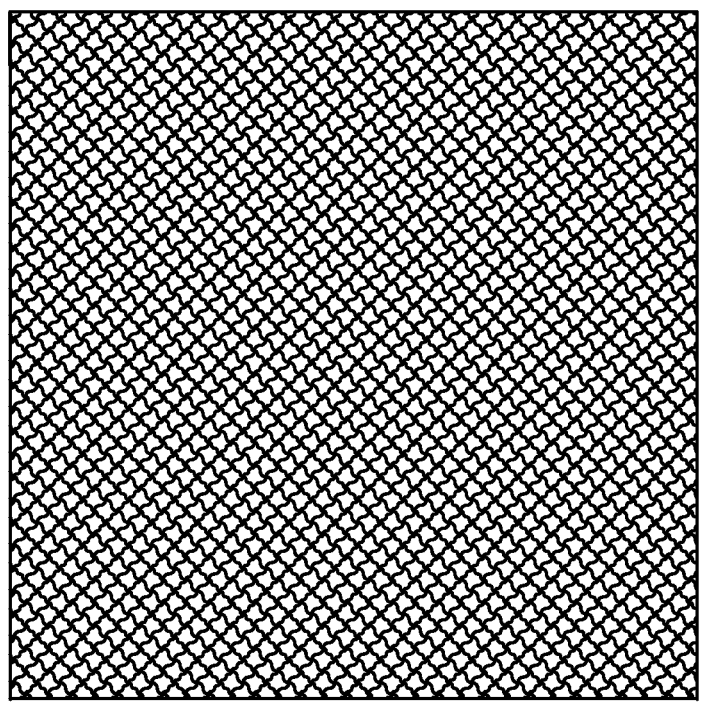
FIG. 12 is a front view showing the use of the first conductive sheet.

An example of a product such as a conductive sheet (hereinafter referred to as the first conductive sheet 100) using the first conductive film 10A will be described below with reference to also FIGS. 5 to 12. FIG. 5 is a front view showing the first conductive sheet 100, FIG. 6 is a back view showing the first conductive sheet 100, FIG. 7 is a top view showing the first conductive sheet 100, FIG. 8 is a bottom view showing the first conductive sheet 100, FIG. 9 is a left side view showing the first conductive sheet 100, and FIG. 10 is a right side view showing the first conductive sheet 100. Further, FIG. 11 is a perspective view showing the first conductive sheet 100, and FIG. 12 is a front view showing the use of the first conductive sheet 100.

The first conductive sheet 100 contains a transparent film substrate 16 and a wavy conductive pattern (conductive portions) 12 formed thereon. The design of the first conductive sheet 100 is continuously formed in the vertical and horizontal directions of the front view. In the first conductive sheet 100, the transparent film substrate 16 is colorless and clear, and the conductive pattern (conductive portions) 12 has a black color.

The first conductive sheet 100 can be used as a part of a defroster (defrosting device) or a window glass for a vehicle, etc. The first conductive sheet 100 can be used also as a heating sheet capable of heat generation by applying electric current. Furthermore, the first conductive sheet 100 can be used as an electrode for a touch panel, an inorganic EL device, an organic EL device, or a solar cell. For example, electrodes are disposed on the opposite ends of the first conductive sheet 100 (e.g., the right and left ends of FIG. 12), and an electric current is flowed from one electrode to the other electrode to heat the conductive pattern 12. Thus, a heating object such as a vehicle headlight covered with snow, which is brought into contact or equipped with the first conductive sheet 100, is heated. As a result, the snow can be melted and removed from the headlight. The pitches of the conductive pattern 12 (the dimensions L1 and L2 of FIG. 5) may be selected within a range of 0.1 to 6.0 mm (more preferably 0.3 to 6.0 mm). In this example, the dimensions L1 and L2 are the same value of about 5.8 mm. The line width of the conductive pattern 12 (the dimension d of FIG. 5) is about 0.1 mm in this example though it may be selected within a range of 0.01 to 0.2 mm. The thickness of the transparent film substrate 16 (the dimension t2 of FIG. 8) is about 0.6 mm in this example though it may be selected within a range of 0.01 to 2.0 mm. The thickness of the conductive pattern 12 (the dimension t1 of FIG. 8) is about 0.1 mm in this example though it may be selected within a range of 0.001 to 0.2 mm.

A conductive film according to a second embodiment (hereinafter referred to as the second conductive film 10B) will be described below with reference to FIG. 13.

Figure 13:
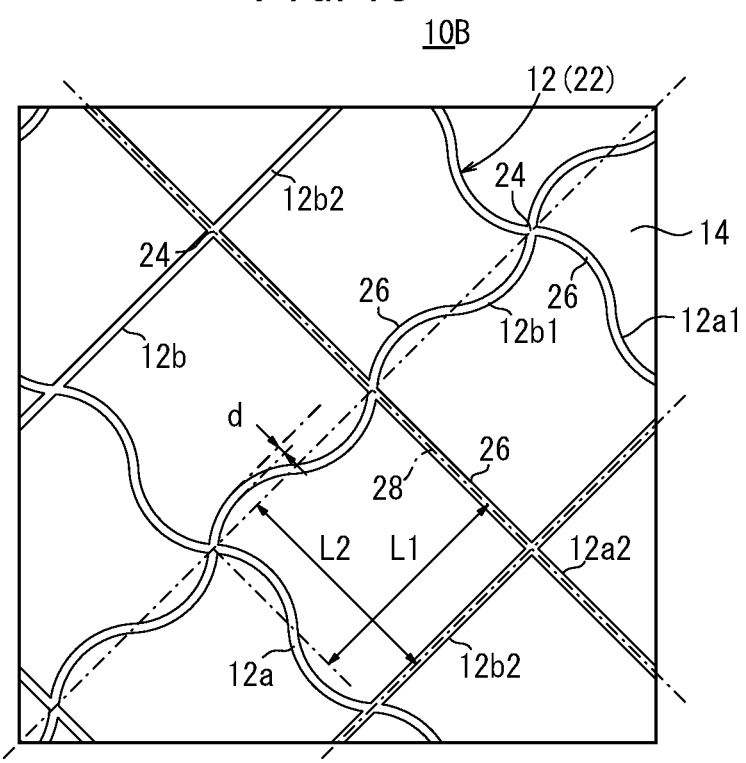
FIG. 13 is a partially-omitted plan view showing a second conductive film.

As shown in FIG. 13, the structure of the second conductive film 10B is approximately the same as that of the above first conductive film 10A, but different in the following respect.

Thus, in the second conductive film 10B, among adjacent parallel first thin metal wires 12a1 and 12a2, one first thin metal wire 12a1 is formed in a wavy line shape containing at least one curve (e.g., the arc 26) between the intersections 24, and the other first thin metal wire 12a2 is formed in a straight line shape.

Similarly, among adjacent parallel second thin metal wires 12b1 and 12b2, one second thin metal wire 12b1 is formed in a wavy line shape containing at least one curve (e.g., the arc 26) between the intersections 24, and the other second thin metal wire 12b2 is formed in a straight line shape.

It should be noted that the wavy line shapes of the one first thin metal wire 12a1 and the one second thin metal wire 12b1 have 1 period of the arcs 26 between the intersections 24.

Though not shown in the drawing, when the second conductive film 10B is used in a transparent heating element 18, first and second electrodes are disposed on the opposite ends of the second conductive film 10B. When an electric current is flowed from the first electrode to the second electrode, the transparent heating element 18 generates heat.

Thus, in the second conductive film 10B, diffraction points are not arranged linearly on the intersections 24 of the conductive portions 12 not having a straight section, whereby the mesh shapes can prevent the glare or the like caused by the interference of the diffracted lights.

Therefore, the second conductive film 10B is suitable for the transparent heating element 18 that can be incorporated in a window glass (such as a building window glass or a vehicle window glass), a vehicle light front cover, etc. Though the first thin metal wires 12a are arranged at the first pitch L1 in one direction and the second thin metal wires 12b are arranged at the second pitch L2 in the other direction in the above first conductive film 10A and the second conductive film 10B, the pitches may be increased or decreased locally. Thus, the opening areas of the opening portions 14 may be locally changed. A local portion having a decreased pitch (an opening portion 14 with a smaller opening area) exhibits higher heat generation efficiency, and a local portion having an increased pitch (an opening portion 14 with a larger opening area) exhibits a higher light transmittance. In the case of using the transparent heating element 18 in a window glass, the pitches may be selected in each portion of the window glass such as a portion requiring rapid snow melting or a portion requiring transparency. Particularly, when the transparent heating element 18 is used in a vehicle window glass (a front window glass), the rapid snow melting, the transparency, and a longer current pathway are required in a portion facing a driver, so that it is preferred that the local portion with an increased pitch and the local portion with a decreased pitch are arranged in combination.

A conductive film according to a third embodiment (hereinafter referred to as the third conductive film 10C) will be described below with reference to FIG. 14.

Figure 14:
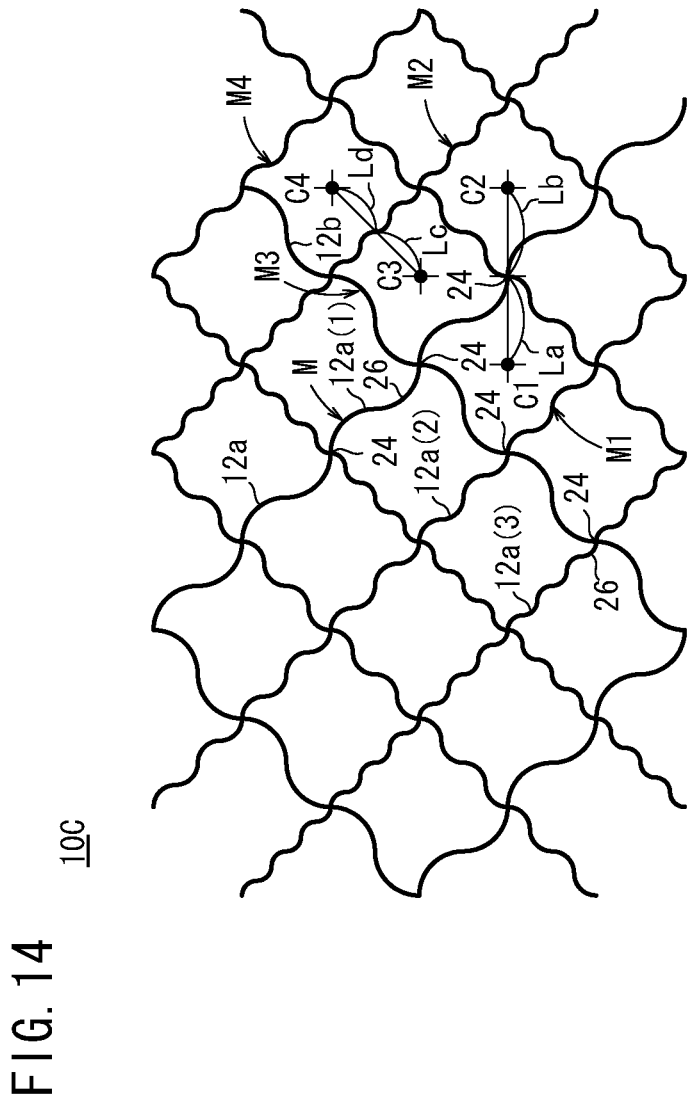
FIG. 14 is an explanatory view schematically showing a mesh pattern of a third conductive film.

As schematically shown in FIG. 14, the structure of the third conductive film 10C is approximately the same as that of the above first conductive film 10A, but different in the following respect.

Thus, for example, in the first thin metal wires 12a, a number-one first thin metal wire 12a(1) has a smallest arrangement period number of the arcs 26 (a largest length of the arrangement period of the arcs 26), and the arrangement period number of the arcs 26 is increased stepwise (the length of the arc arrangement period is reduced stepwise) from the number-one first thin metal wire 12a(1) to another first thin metal wire 12a arranged in one direction. In the example of FIG. 14, the number-one first thin metal wire 12a(1) has an arc arrangement period number of 1, the number-two first thin metal wire 12a(2) adjacent to the number-one first thin metal wire 12a(1) in the one direction has an arc arrangement period number of 2, and the number-three first thin metal wire 12a(3) adjacent to the number-two first thin metal wire 12a(2) in the one direction has an arc arrangement period number of 3. The combinations of the wires are arranged in the one direction. The first thin metal wire 12a adjacent to the number-one first thin metal wire 12a(1) in the opposite direction has an arc arrangement period number of 3. Therefore, the first thin metal wire 12a having the largest arc arrangement period number is adjacent to the first thin metal wire 12a having the smallest arc arrangement period number. The second thin metal wires 12b are arranged in the same manner.

Also in the third conductive film 10C, the conductive portions 12 hardly have a straight section, so that diffraction points are not arranged linearly on the intersections 24 of the conductive portions 12. In addition, the adjacent parallel thin metal wires 12 are formed in the wavy line shapes with different periods, whereby the diffraction points are discretely distributed to further reduce the glare or the like caused by the interference of diffracted lights.

The number of the arcs 26 on the circumference line of one mesh shape M is 2k (k=1, 2, 3, . . . ). Therefore, though the surface resistance lowering effect of the third conductive film 10C is lower than that of the first conductive film 10A having the number 4k, the third conductive film 10C is capable of improving heat generation efficiency in a transparent heating element and improving power generation efficiency in a solar cell.

Figure 15:
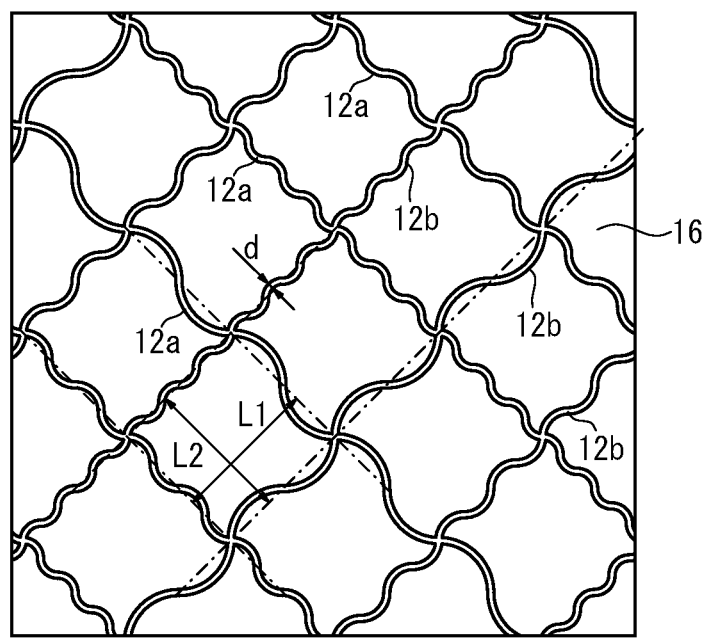
FIG. 15 is a front view showing a product (a conductive sheet) using the third conductive film (a second conductive sheet)
Figure 16:
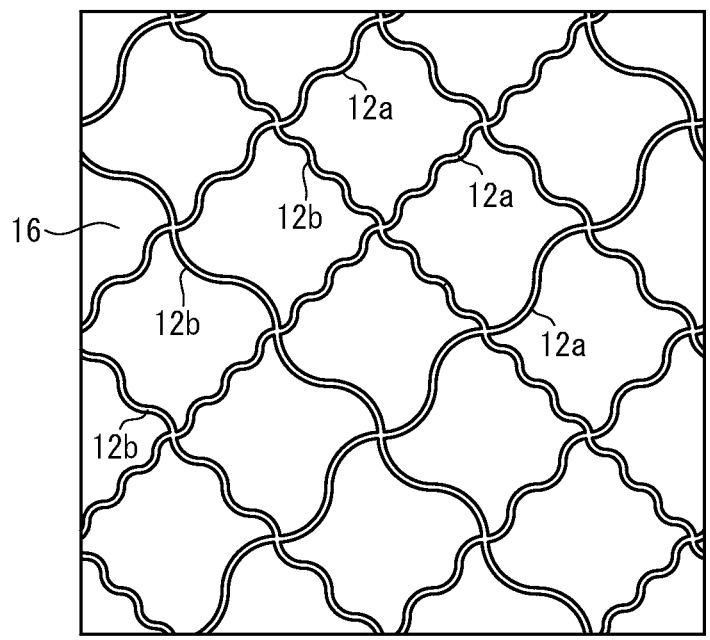
FIG. 16 is a back view showing the second conductive sheet.
Figure 17:
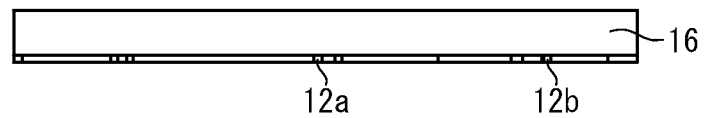
FIG. 17 is a top view showing the second conductive sheet.
Figure 18:
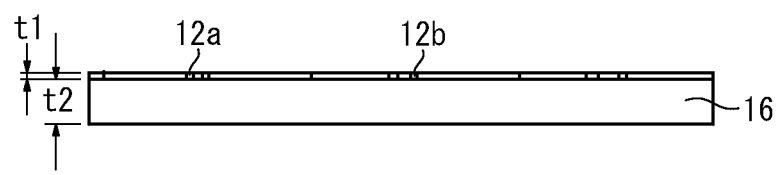
FIG. 18 is a bottom view showing the second conductive sheet.
Figure 19:
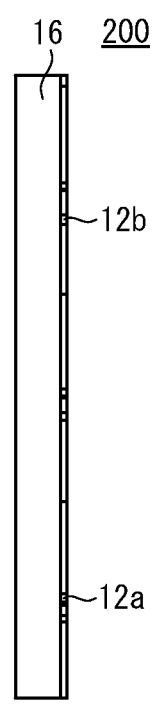
FIG. 19 is a left side view showing the second conductive sheet.
Figure 20:
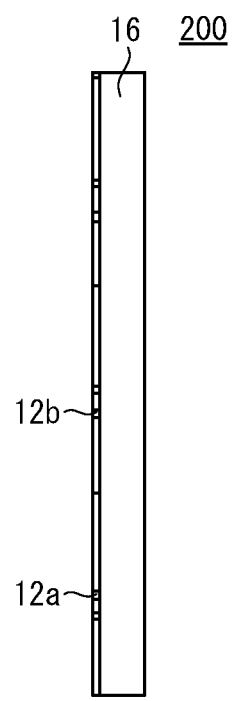
FIG. 20 is a right side view showing the second conductive sheet.
Figure 21:
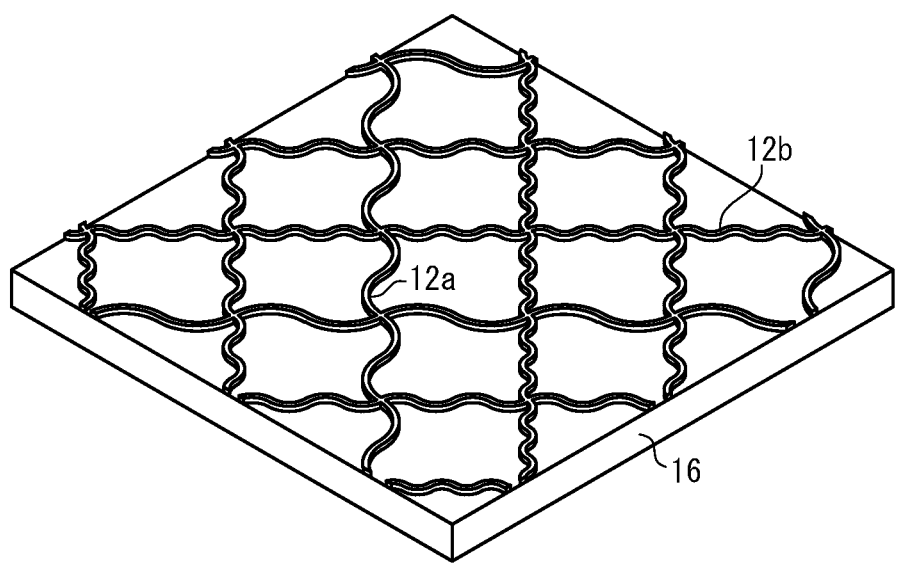
FIG. 21 is a perspective view showing the second conductive sheet.
Figure 22:
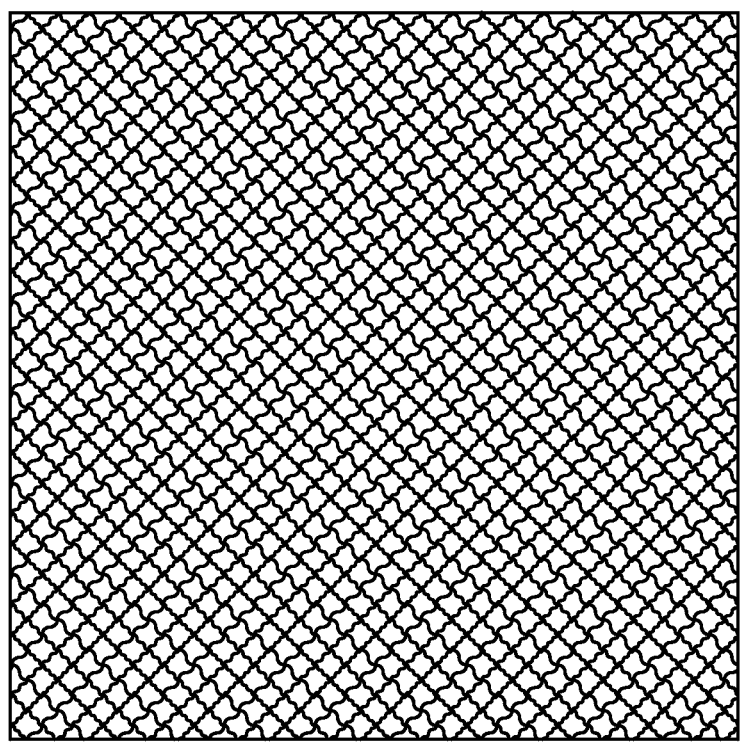
FIG. 22 is a front view showing the use of the second conductive sheet.

An example of a product such as a conductive sheet (hereinafter referred to as the second conductive sheet 200) using the third conductive film 10C will be described below with reference also to FIGS. 15 to 22. FIG. 15 is a front view showing the second conductive sheet 200, FIG. 16 is a back view showing the second conductive sheet 200, FIG. 17 is a top view showing the second conductive sheet 200, FIG. 18 is a bottom view showing the second conductive sheet 200, FIG. 19 is a left side view showing the second conductive sheet 200, and FIG. 20 is a right side view showing the second conductive sheet 200. Further, FIG. 21 is a perspective view showing the second conductive sheet 200, and FIG. 22 is a front view showing the use of the second conductive sheet 200.

The second conductive sheet 200 contains a transparent film substrate 16 and a wavy conductive pattern (conductive portions) 12 formed thereon. The design of the second conductive sheet 200 is continuously formed in the vertical and horizontal directions of the front view. In the second conductive sheet 200, the transparent film substrate 16 is colorless and clear, and the conductive pattern (conductive portions) 12 has a black color.

The second conductive sheet 200 can be used as a part of a defroster (defrosting device) or a window glass for a vehicle, etc. The second conductive sheet 200 can be used also as a heating sheet capable of heat generation by applying electric current. Furthermore, the second conductive sheet 200 can be used as an electrode for a touch panel, an inorganic EL device, an organic EL device, or a solar cell. For example, electrodes are disposed on the opposite ends of the second conductive sheet 200 (e.g., the right and left ends of FIG. 22), and an electric current is flowed from one electrode to the other electrode to heat the conductive pattern 12. Thus, a heating object such as a vehicle headlight covered with snow, which is brought into contact or equipped with the second conductive sheet 200, is heated. As a result, the snow can be melted and removed from the headlight. The pitches of the conductive pattern 12 (the dimensions L1 and L2 of FIG. 15) may be selected within a range of 0.15 to 6.0 mm. In this example, the dimensions L1 and L2 are the same value of about 5.8 mm. The line width of the conductive pattern 12 (the dimension d of FIG. 15) is about 0.1 mm in this example though it may be selected within a range of 0.01 to 0.2 mm. The thickness of the transparent film substrate 16 (the dimension t2 of FIG. 18) is about 0.6 mm in this example though it may be selected within a range of 0.01 to 2.0 mm. The thickness of the conductive pattern 12 (the dimension t1 of FIG. 18) is about 0.1 mm in this example though it may be selected within a range of 0.001 to 0.2 mm.

A conductive film according to a fourth embodiment (hereinafter referred to as the fourth conductive film 10D) will be described below with reference to FIG. 23.

Figure 23:
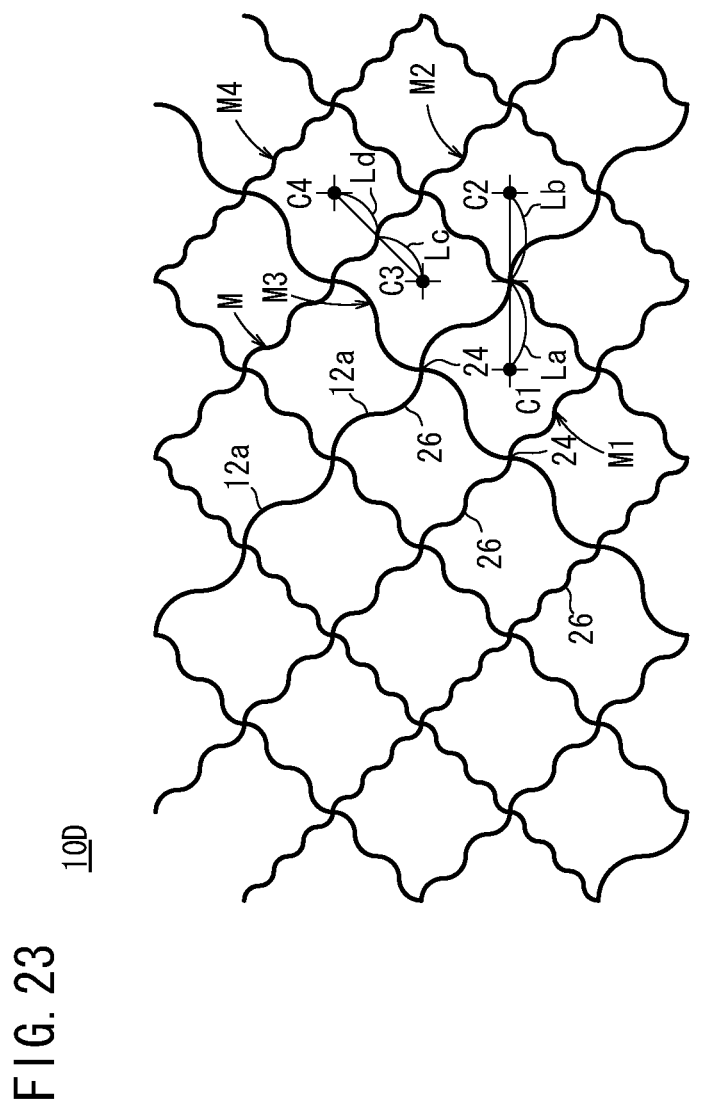
FIG. 23 is an explanatory view schematically showing a mesh pattern of a fourth conductive film.

As schematically shown in FIG. 23, the structure of the fourth conductive film 10D is approximately the same as that of the above third conductive film 10C, but different in the following respect.

Thus, for example, in the first thin metal wires 12a, two first thin metal wires 12a disposed adjacently on either side of a first thin metal wire 12a having a smallest arc arrangement period number (a largest arc arrangement period length) have the same arc arrangement period number, and two first thin metal wires 12a disposed adjacently on either side of a first thin metal wire 12a having a largest arc arrangement period number (a smallest arc arrangement period length) have the same arc arrangement period number. The second thin metal wires 12b are formed in the same manner.

Also in the fourth conductive film 10D, the conductive portions 12 hardly have a straight section, so that diffraction points are not arranged linearly on the intersections 24 of the conductive portions 12. In addition, the adjacent parallel thin metal wires 12 are formed in the wavy line shapes with different periods, whereby the diffraction points are discretely distributed to further reduce the glare or the like caused by the interference of diffracted lights.

In the fourth conductive film 10D, the number of the arcs 26 on the circumference line of one mesh shape M is 4k (k=1, 2, 3, . . . ). Therefore, the fourth conductive film 10D is capable of improving heat generation efficiency in a transparent heating element and improving power generation efficiency in a solar cell.

Though not shown in the drawings, for example, the pattern of the first thin metal wires 12a may be arranged such that, calling one first thin metal wire 12a having a smallest arc arrangement period number a number-one first thin metal wire 12a, the arc arrangement period number of the first thin metal wire 12a is increased stepwise from the number-one first thin metal wire 12a in one direction in the same manner as in the third conductive film 10C, and the pattern of the second thin metal wires 12b may be arranged such that two second thin metal wires 12b disposed adjacently on either side of a second thin metal wire 12b having a smallest arc arrangement period number have the same arc arrangement period number and two second thin metal wires 12b disposed adjacently on either side of a second thin metal wire 12b having a largest arc arrangement period number have the same arc arrangement period number in the same manner as in the fourth conductive film 10D. Of course, conversely, the first thin metal wires 12a may be patterned in the same manner as in the fourth conductive film 10D, and the second thin metal wires 12b may be patterned in the same manner as in the third conductive film 10C.

A conductive film according to a fifth embodiment (hereinafter referred to as the fifth conductive film 10E) will be described below with reference to FIG. 24.

Figure 24:
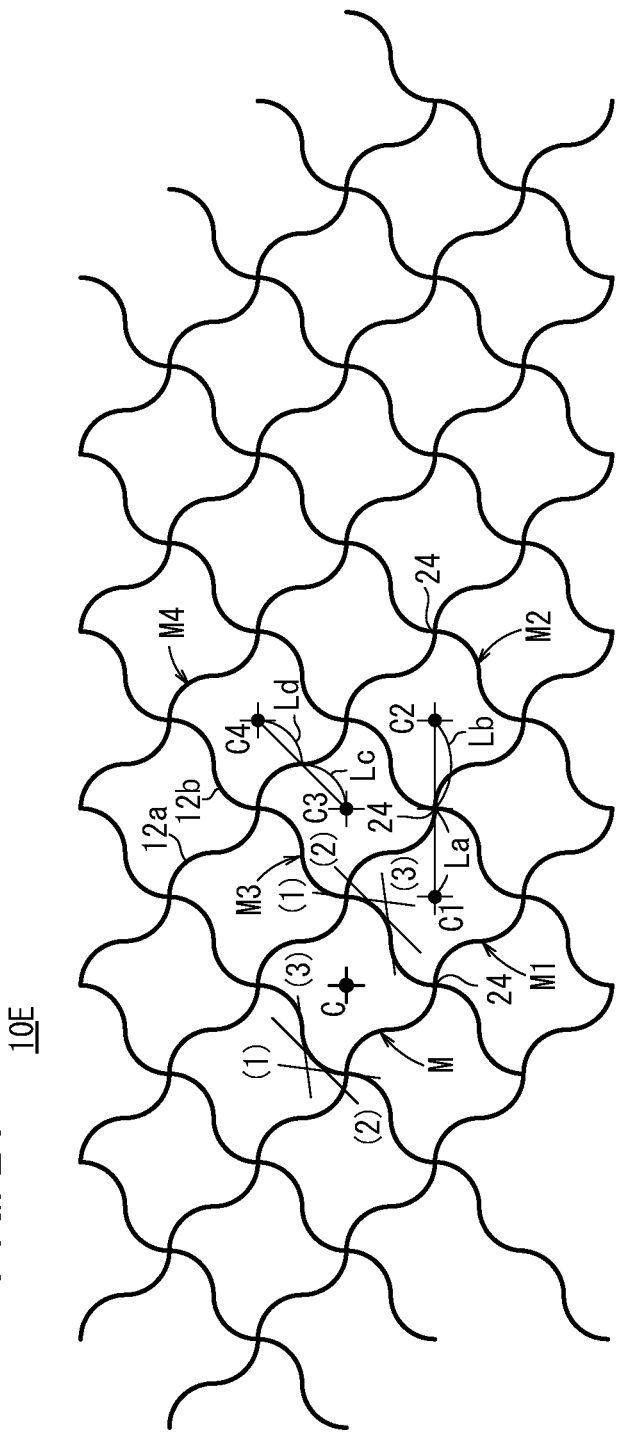
FIG. 24 is an explanatory view schematically showing a mesh pattern of a fifth conductive film.

As schematically shown in FIG. 24, the structure of the fifth conductive film 10E is approximately the same as that of the above first conductive film 10A, but different in the following respect.

Thus, the conductive portions 12 have a wavy line shape with a constant period. In the example of FIG. 24, 1 period of the arcs are arranged between the intersections 24.

In the fifth conductive film 10E, the first line segment length La is equal to the second line segment length Lb, and the third line segment length Lc is equal to the fourth line segment length Ld, as in the first conductive film 10A. However, as shown in FIG. 24, a pair of optional tangent lines, which are positioned on the circumference line of each mesh shape M symmetrically about the central point C of the mesh shape M, are parallel to each other. Specifically, in FIG. 24, for example, a pair of first tangent lines (1)(1), a pair of second tangent lines (2)(2), and a pair of third tangent lines (3)(3) are parallel to each other, respectively, and have different tangent directions. In general, a light is highly refracted and diffracted in a tangent direction. In the fifth conductive film 10E, a light can be refracted and diffracted in a large number of the different tangent directions to reduce the significant glare.

Furthermore, in the fifth conductive film 10E, the opening portions 14 have approximately constant opening areas, whereby the glare or the like caused by the interference of diffracted lights can be prevented on the whole surface, and the significant glare or the like is not caused locally.

In addition, in the fifth conductive film 10E, the number of the arcs 26 on the circumference line of one mesh shape M is 4k (k=1, 2, 3, . . . ). Therefore, the fifth conductive film 10E is capable of improving heat generation efficiency in a transparent heating element and improving power generation efficiency in a solar cell.

A conductive film according to a sixth embodiment (hereinafter referred to as the sixth conductive film 10F) will be described below with reference to FIG. 25.

Figure 25:
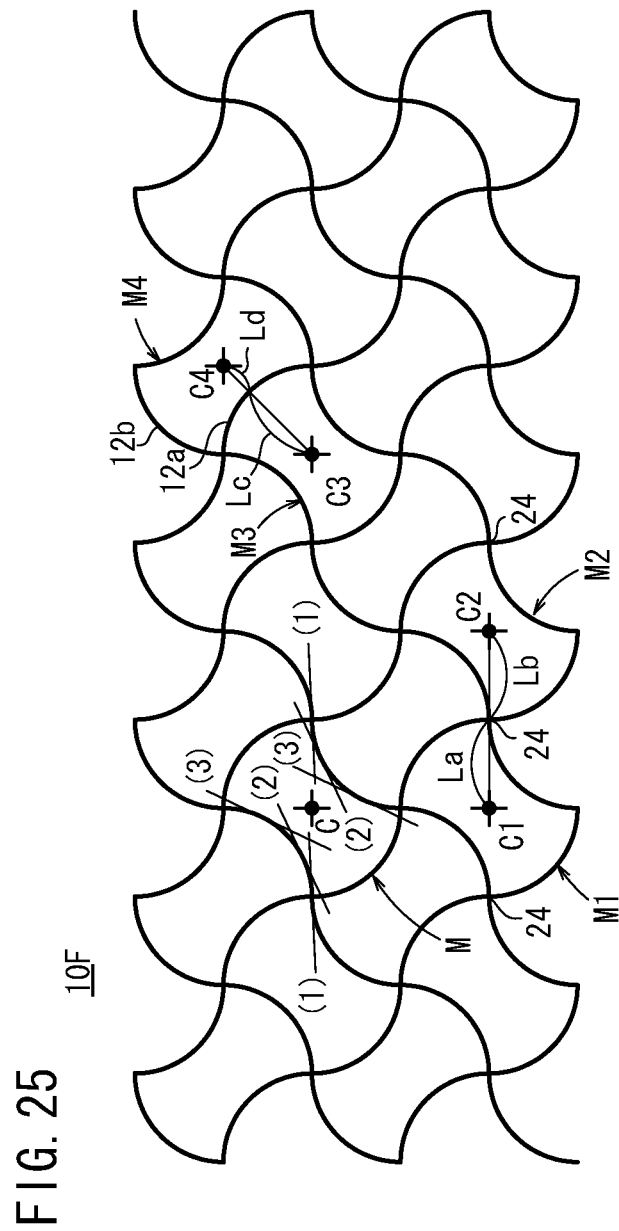
FIG. 25 is an explanatory view schematically showing a mesh pattern of a sixth conductive film.

As schematically shown in FIG. 25, the structure of the sixth conductive film 10F is approximately the same as that of the above fifth conductive film 10E.

Thus, in the sixth conductive film 10F, the first line segment length La is equal to the second line segment length Lb as in the fifth conductive film 10E. In addition, a pair of optional tangent lines, which are positioned on the circumference line of each mesh shape M symmetrically about the central point C of the mesh shape M, are parallel to each other.

However, unlike the fifth conductive film 10E, in a line connecting the central points C3 and C4 of two optional mesh shapes M3 and M4 adjacently disposed along the extending direction of the second thin metal wire 12b, the length Lc of a third line segment connecting the central point C3 of one mesh shape M3 and the first thin metal wire 12a is different from the length Ld of a fourth line segment connecting the central point C4 of the other mesh shape M4 and the first thin metal wire 12a. In the example of FIG. 25, the length Lc is larger than the length Ld. It should be noted that the intersections 24 are at a distance of 0.5 periods in this example.

As in the fifth conductive film 10E, also in the sixth conductive film 10F, a light can be refracted and diffracted in a large number of the different tangent directions to reduce the significant glare. Furthermore, the opening portions 14 have approximately constant opening areas, whereby the glare or the like caused by the interference of diffracted lights can be prevented on the whole surface, and the significant glare or the like is not caused locally.

A conductive film according to a seventh embodiment (hereinafter referred to as the seventh conductive film 10G) will be described below with reference to FIG. 26.

Figure 26:
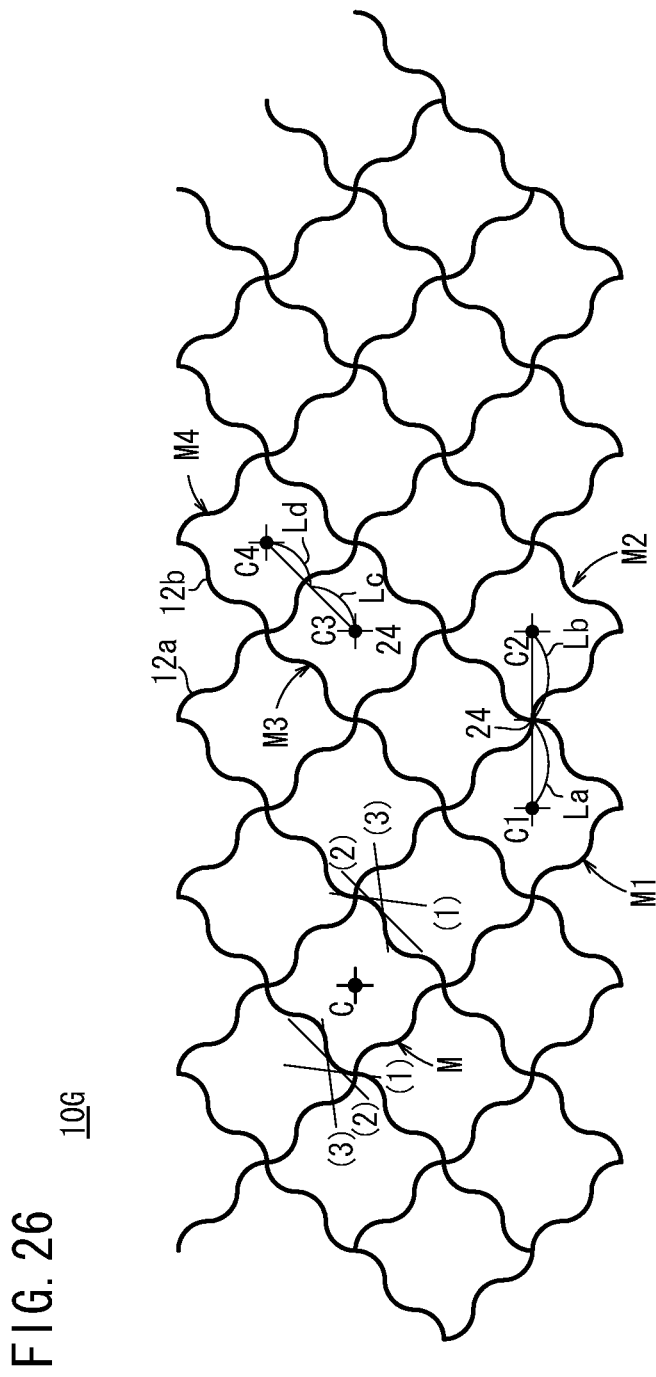
FIG. 26 is an explanatory view schematically showing a mesh pattern of a seventh conductive film.

As schematically shown in FIG. 26, the structure of the seventh conductive film 10G is approximately the same as that of the above sixth conductive film 10F.

Thus, in the seventh conductive film 10G, the distance La is equal to the distance Lb, the distance Lc is different from the distance Ld, and a pair of optional tangent lines, which are positioned on the circumference line of each mesh shape M symmetrically about the central point C of the mesh shape M, are parallel to each other.

The seventh conductive film 10G is different from the sixth conductive film 10F in that 1.5 periods of the arcs are arranged between the intersections 24.

Also in the seventh conductive film 10G, a light can be refracted and diffracted in a large number of different directions to reduce the significant glare. Furthermore, the opening portions 14 have approximately constant opening areas, whereby the glare or the like caused by the interference of diffracted lights can be prevented on the whole surface, and the significant glare or the like is not caused locally.

A conductive film according to an eighth embodiment (hereinafter referred to as the eighth conductive film 10H) will be described below with reference to FIG. 27.

Figure 27:
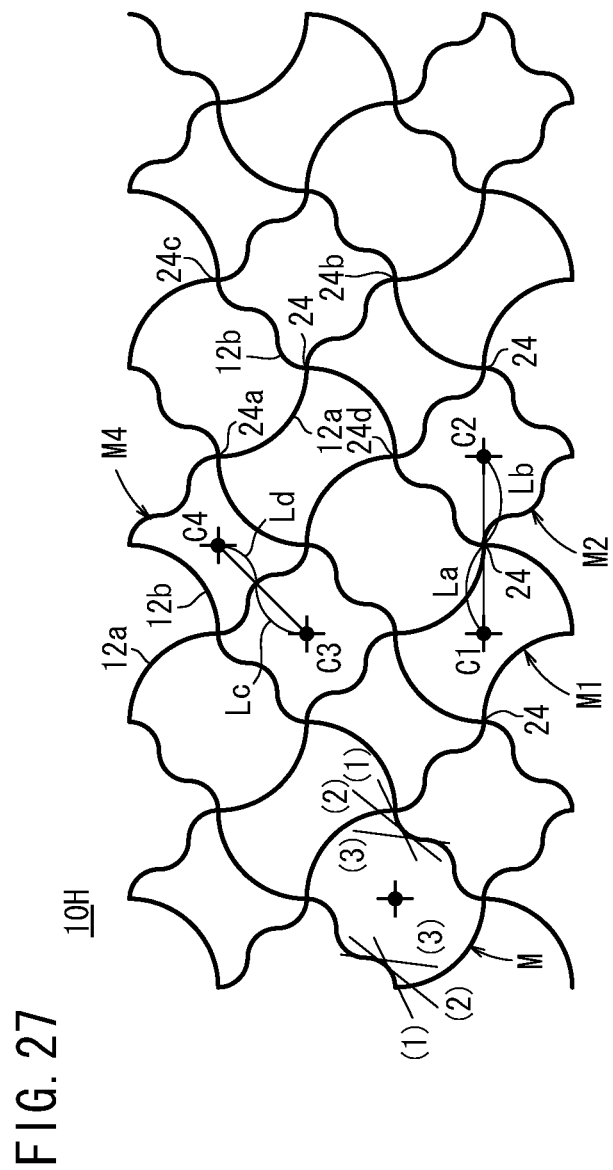
FIG. 27 is an explanatory view schematically showing a mesh pattern of an eighth conductive film.

As schematically shown in FIG. 27, the structure of the eighth conductive film 10H is approximately the same as that of the above sixth conductive film 10F.

Thus, in the eighth conductive film 10H, the distance La is equal to the distance Lb, the distance Lc is different from the distance Ld, and a pair of optional tangent lines, which are positioned on the circumference line of each mesh shape M symmetrically about the central point C of the mesh shape M, are parallel to each other.

The eighth conductive film 10H is different from the sixth conductive film 10F in that the arc arrangement period between one intersection 24 and a first intersection 24a adjacently disposed at one side of the one intersection 24 along the extending direction of the first thin metal wire 12a is different from the arc arrangement period between the one intersection 24 and a second intersection 24b adjacently disposed at the other side of the one intersection 24. In the example of FIG. 27, in the arc arrangement, the one intersection 24 and the first intersection 24a are at a distance of 0.5 periods, and the one intersection 24 and the second intersection 24b are at a distance of 1.5 periods.

In addition, the arc arrangement period between the one intersection 24 and a third intersection 24c adjacently disposed at one side of the one intersection 24 along the extending direction of the second thin metal wire 12b is different from the arc arrangement period between the one intersection 24 and a fourth intersection 24d adjacently disposed at the other side of the one intersection 24. In the example of FIG. 27, in the arc arrangement, the one intersection 24 and the third intersection 24c are at a distance of 1.5 periods, and the one intersection 24 and the fourth intersection 24d are at a distance of 0.5 periods.

Also in the eighth conductive film 10H, a light can be refracted and diffracted in a large number of different directions to reduce the significant glare.

In the fifth to eighth conductive films 10E to 10H as well as the first conductive film 10A, the number of the arcs 26 on the circumference line of one mesh shape M is 4k (k=1, 2, 3, . . . ). Therefore, the films are capable of exhibiting a low overall surface resistance, improving heat generation efficiency in a transparent heating element, and improving power generation efficiency in a solar cell.

Then, several methods for producing the first to eighth conductive films 10A to 10H (hereinafter collectively referred to as the conductive film 10) will be described below with reference to FIGS. 28A to 31.

In the first production method, a photosensitive silver salt layer is formed, exposed, developed, and fixed on the transparent film substrate 16 to form metallic silver portions. The metallic silver portions and a conductive metal disposed thereon are utilized for forming the mesh pattern 22.

Figure 28A:
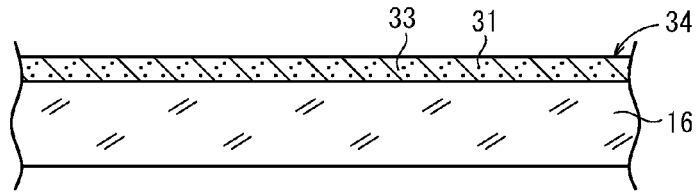
FIGS. 28A to 28E are views showing the process of a first production method for producing a conductive film according to an embodiment of the present invention.

Specifically, as shown in FIG. 28A, the transparent film substrate 16 is coated with a photosensitive silver salt layer 34 containing a mixture of a gelatin 33 and a silver halide 31 (e.g., silver bromide particles, silver chlorobromide particles, or silver iodobromide particles). Though the silver halide 31 is exaggeratingly shown by points in FIGS. 28A to 28C to facilitate understanding, the points do not represent the size, concentration, etc.

Figure 28B:
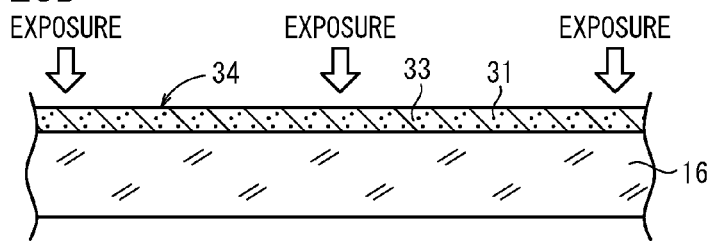

Then, as shown in FIG. 28B, the photosensitive silver salt layer 34 is subjected to an exposure treatment for forming the mesh pattern 22. When an optical energy is applied to the silver halide 31, the silver halide 31 is exposed to generate invisible minute silver nuclei, referred to as a latent image.

Figure 28C:
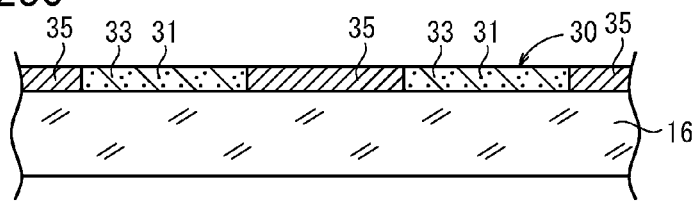

As shown in FIG. 28C, the photosensitive silver salt layer 34 is subjected to a development treatment for converting the latent image to an image visible to the naked eye. Specifically, the photosensitive silver salt layer 34 having the latent image is developed using a developer, which is an alkaline or acidic solution, generally an alkaline solution. In the development treatment, using the latent image silver nuclei as catalyst cores, silver ions from the silver halide particles or the developer are reduced to metallic silver by a reducing agent in the developer (referred to as a developing agent). As a result, the latent image silver nuclei are grown to form a visible silver image (developed silver 35).

Figure 28D:
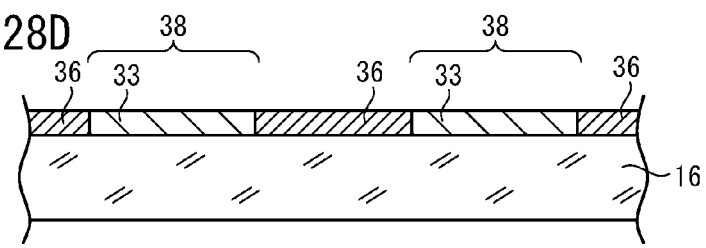

The photosensitive silver halide 31 remains in the photosensitive silver salt layer 34 after the development treatment. As shown in FIG. 28D, the silver halide 31 is removed by a fixation treatment using a fixer, which is an acidic or alkaline solution, generally an acidic solution.

After the fixation treatment, metallic silver portions 36 are formed in exposed areas, and light-transmitting portions 38 containing only the gelatin 33 are formed in unexposed areas. Thus, the combination of the metallic silver portions 36 and the light-transmitting portions 38 is formed on the transparent film substrate 16.

In a case where silver bromide is used as the silver halide 31 and a thiosulfate salt is used in the fixation treatment, a reaction represented by the following formula proceeds in the treatment.

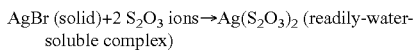

AgBr (solid)+2 $S_2O_3$ ions→$Ag(S_2O_3)_2$ (readily-water-soluble complex)

Two thiosulfate $S_2O_3$ ions and one silver ion in the gelatin 33 (from AgBr) are reacted to generate a silver thiosulfate complex. The silver thiosulfate complex has a high water solubility, and thereby is eluted from the gelatin 33. As a result, the developed silvers 35 are fixed and remain as the metallic silver portions 36.

Thus, the latent image is reacted with the reducing agent to deposit the developed silvers 35 in the development treatment, and the residual silver halide 31, not converted to the developed silvers 35, is eluted into water in the fixation treatment. The treatments are described in detail in T. H. James, "The Theory of the Photographic Process, 4th ed.", Macmillian Publishing Co., Inc., NY, Chapter 15, pp. 438-442, 1977.

The development treatment is generally carried out using the alkaline solution. The alkaline solution used in the development treatment may be mixed into the fixer (generally an acidic solution), whereby the activity of the fixer may be disadvantageously changed in the fixation treatment. Further, the developer may remain on the film after removing the film from the development bath, whereby an undesired development reaction may be accelerated by the developer. Thus, it is preferred that the photosensitive silver salt layer 34 is neutralized or acidified by a quencher such as an acetic acid solution after the development treatment before the fixation treatment.

Figure 28E:
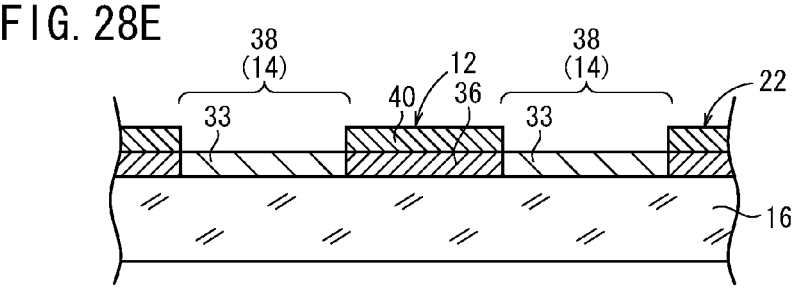

As shown in FIG. 28E, a conductive metal 40 may be disposed only on the metallic silver portions 36 by a plating treatment (such as an electroless plating treatment, an electroplating treatment, or a combination thereof), etc. In this case, the mesh pattern 22 is formed of the metallic silver portions 36 on the transparent film substrate 16 and the conductive metal 40 disposed on the metallic silver portions 36.

The difference between the above mentioned process using the photosensitive silver salt layer 34 (a silver salt photography technology) and a process using a photoresist (a resist technology) will be described below.

In the resist technology, a photopolymerization initiator absorbs a light in an exposure treatment to initiate a reaction, a photoresist film (a resin) per se undergoes a polymerization reaction to increase or decrease the solubility in a developer, and the resin in an exposed or unexposed area is removed in a development treatment. The developer liquid used in the resist technology may be an alkaline solution free of reducing agents, in which an unreacted resin component can be dissolved. On the other hand, as described above, in the silver salt photography technology according to the present invention, the minute silver nuclei (the so-called latent image) are formed from the silver ion and a photoelectron generated in the silver halide 31 exposed in the exposure treatment. The latent image silver nuclei are grown to form the visible silver image in the development treatment using the developer, which must contain the reducing agent (the developing agent). Thus, the resist technology and the silver salt photography technology are greatly different in the reactions in the exposure and development treatments.

In the development treatment of the resist technology, the unpolymerized resin portion in the exposed or unexposed area is removed. On the other hand, in the development treatment of the silver salt photography technology, using the latent image as the catalyst core, the reduction reaction is conducted by the reducing agent contained in the developer (the developing agent), and the developed silver 35 is grown into a visible size. The gelatin 33 in the unexposed area is not removed. Thus, the resist technology and the silver salt photography technology are greatly different also in the reactions in the development treatments.

The silver halide 31 contained in the gelatin 33 in the unexposed area is eluted in the following fixation treatment, and the gelatin 33 is not removed.

The main reaction component (the main photosensitive component) is the silver halide in the silver salt photography technology, while it is the photopolymerization initiator in the resist technology. Further, in the development treatment, the binder (the gelatin 33) remains in the silver salt photography technology, while it is removed in the resist technology. The resist technology and the silver salt photography technology are greatly different in these points.

A mask used in the exposure treatment of the photosensitive silver salt layer 34 may have a mask pattern corresponding to the mesh pattern 22 of the conductive portions 12 having the wavy line shape containing at least one curve between the intersections 24.

Figure 29A:
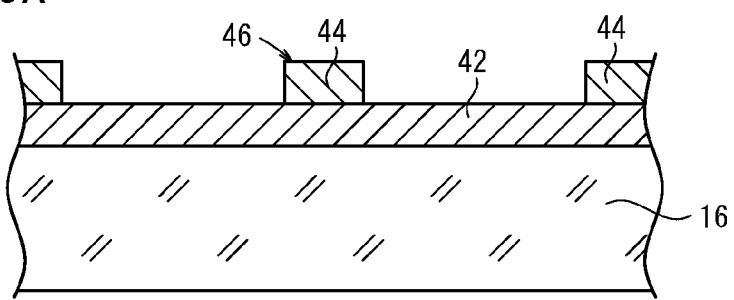
FIGS. 29A and 29B are views showing the process of a second production method for producing the conductive film of the embodiment.
Figure 29B:
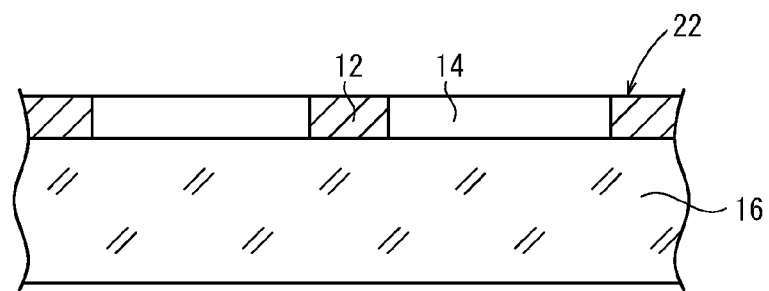

In another method (the second production method), for example, as shown in FIG. 29A, a photoresist film 44 is formed on a copper foil 42 disposed on the transparent film substrate 16, and the photoresist film 44 is exposed and developed to form a resist pattern 46. As shown in FIG. 29B, the copper foil 42 exposed from the resist pattern 46 is etched to form the mesh pattern 22. In this method, a mask used in the exposure treatment of the photoresist film 44 may have a mask pattern corresponding to the mesh pattern 22.

Figure 30A:
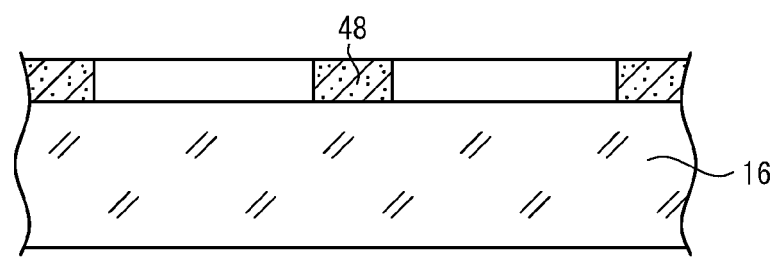
FIGS. 30A and 30B are views showing the process of a third production method for producing the conductive film of the embodiment.
Figure 30B:
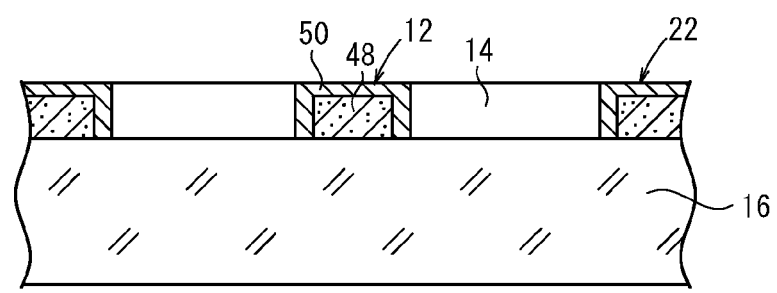

In the third production method, as shown in FIG. 30A, a paste 48 containing fine metal particles is printed on the transparent film substrate 16. As shown in FIG. 30B, the printed paste 48 may be plated with a metal 50 to form the mesh pattern 22.

Figure 31:
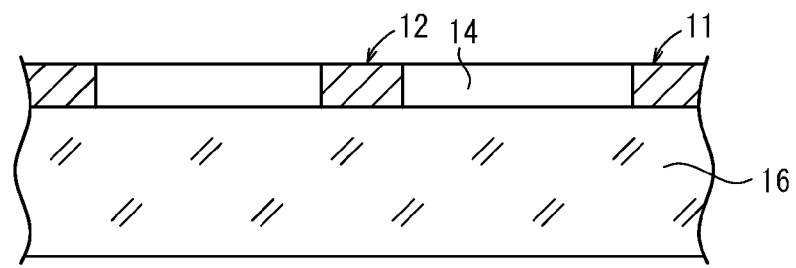
FIG. 31 is a view showing the process of a fourth production method for producing the conductive film of the embodiment.

In the fourth production method, as shown in FIG. 31, the mesh pattern 22 may be printed on the transparent film substrate 16 by using a screen or gravure printing plate.

A particularly preferred method of forming a thin conductive metal film using a photographic photosensitive silver halide material for the conductive film 10 of this embodiment will be mainly described below.

As described above, the conductive film 10 of this embodiment may be produced as follows. A photosensitive material having the transparent film substrate 16 and thereon a photosensitive silver halide-containing emulsion layer is exposed and developed, whereby the metallic silver portions 36 and the light-transmitting portions 38 are formed in the exposed areas and the unexposed areas respectively. The metallic silver portions 36 may be subjected to a physical development treatment and/or a plating treatment to deposit the conductive metal 40 thereon.

The method for forming the conductive film 10 of the embodiment includes the following three processes, depending on the photosensitive materials and development treatments.

(1) A process comprising subjecting a photosensitive black-and-white silver halide material free of physical development nuclei to a chemical or thermal development, to form the metallic silver portions 36 on the photosensitive material.

(2) A process comprising subjecting a photosensitive black-and-white silver halide material having a silver halide emulsion layer containing physical development nuclei to a solution physical development, to form the metallic silver portions 36 on the photosensitive material.

(3) A process comprising subjecting a stack of a photosensitive black-and-white silver halide material free of physical development nuclei and an image-receiving sheet having a non-photosensitive layer containing physical development nuclei to a diffusion transfer development, to form the metallic silver portions 36 on the non-photosensitive image-receiving sheet.

In the process of (1), an integral black-and-white development procedure is used to form a transmittable conductive film such as an electromagnetic-shielding film or a light-transmitting conductive film on the photosensitive material. The resulting silver is a chemically or thermally developed silver containing a high-specific surface area filament, and thereby shows a high activity in the following plating or physical development treatment.

In the process of (2), the silver halide particles are melted around the physical development nuclei and deposited on the nuclei in the exposed areas, to form a transmittable conductive film such as a light-transmitting electromagnetic-shielding film or a light-transmitting conductive film on the photosensitive material. Also in this process, an integral black-and-white development procedure is used. Though high activity can be achieved since the silver halide is deposited on the physical development nuclei in the development, the developed silver has a spherical shape with small specific surface.

In the process of (3), the silver halide particles are melted in unexposed areas, and diffused and deposited on the development nuclei of the image-receiving sheet, to form a transmittable conductive film such as an electromagnetic-shielding film or a light-transmitting conductive film on the sheet. In this process, a so-called separate-type procedure is used, and the image-receiving sheet is peeled off from the photosensitive material.

A negative or reversal development treatment can be used in the processes. In the diffusion transfer development, the negative development treatment can be carried out using an auto-positive photosensitive material.

The chemical development, thermal development, solution physical development, and diffusion transfer development have the meanings generally known in the art, and are explained in common photographic chemistry texts such as Shin-ichi Kikuchi, "Shashin Kagaku (Photographic Chemistry)", Kyoritsu Shuppan Co., Ltd., 1955 and C. E. K. Mees, "The Theory of Photographic Processes, 4th ed.", Mcmillan, 1977. A liquid treatment is generally used in the present invention, and also a thermal development treatment can be utilized. For example, techniques described in Japanese Laid-Open Patent Publication Nos. 2004-184693, 2004-334077, and 2005-010752, and Japanese Patent Application Nos. 2004-244080 and 2004-085655 can be used in the present invention.

(Photosensitive Material)
[Transparent Support]

The transparent film substrate 16 of the photosensitive material used in the production method of the embodiment may be a plastic film, etc.

In this embodiment, it is preferred that the plastic film is a polyethylene terephthalate film or a triacetyl cellulose (TAC) film from the viewpoints of light transmittance, heat resistance, handling, and cost.

In a transparent heating element for a window glass, the transparent film substrate 16 preferably has a high light transmittance. In this case, the total visible light transmittance of the plastic film is preferably 70% to 100%, more preferably 85% to 100%, particularly preferably 90% to 100%. The plastic film may be colored as long as it does not interfere with the advantageous effects of the present invention.

[Protective Layer]

In the photosensitive material, a protective layer may be formed on the emulsion layer to be hereinafter described. The protective layer used in this embodiment contains a binder such as a gelatin or a high-molecular polymer, and is formed on the photosensitive emulsion layer to improve the scratch prevention or mechanical property.

[Emulsion Layer]

The photosensitive material used in the production method of this embodiment preferably has the transparent film substrate 16 and thereon the emulsion layer containing the silver salt as a light sensor (the silver salt-containing layer). The emulsion layer according to the embodiment may contain a dye, a binder, a solvent, etc. in addition to the silver salt if necessary.

The ratio of the dye to the total solid contents in the emulsion layer is preferably 0.01% to 10% by mass, more preferably 0.1% to 5% by mass, in view of the effects such as the irradiation prevention effect and the sensitivity reduction due to the excess addition.

<Silver Salt>

The silver salt used in this embodiment is preferably an inorganic silver salt such as a silver halide. It is particularly preferred that the silver salt is used in the form of particles for the photographic photosensitive silver halide material. The silver halide has an excellent light sensing property.

The silver halide, preferably used in the photographic emulsion of the photographic photosensitive silver halide material, will be described below.

In this embodiment, the silver halide is preferably used as a light sensor. Silver halide technologies for photographic silver salt films, photographic papers, print engraving films, emulsion masks for photomasking, and the like may be utilized in this embodiment.

The silver halide may contain a halogen element of chlorine, bromine, iodine, or fluorine, and may contain a combination of the elements. For example, the silver halide preferably contains AgCl, AgBr, or AgI, more preferably contains AgBr or AgCl, as a main component. Also silver chlorobromide, silver iodochlorobromide, or silver iodobromide is preferably used as the silver halide. The silver halide is further preferably silver chlorobromide, silver bromide, silver iodochlorobromide, or silver iodobromide, most preferably silver chlorobromide or silver iodochlorobromide having a silver chloride content of 50 mol % or more.

The term "the silver halide contains AgBr (silver bromide) as a main component" means that the mole ratio of bromide ion is 50% or more in the silver halide composition. The silver halide particle containing AgBr as a main component may contain iodide or chloride ion in addition to the bromide ion.

The silver halide emulsion, used as a coating liquid for the emulsion layer in this embodiment, may be prepared by a method described in P. Glafkides, "Chimie et Physique Photographique", Paul Montel, 1967, G. F. Dufin, "Photographic Emulsion Chemistry", The Forcal Press, 1966, V. L. Zelikman, et al., "Making and Coating Photographic Emulsion", The Forcal Press, 1964, etc.

<Binder>

The binder may be used in the emulsion layer to uniformly disperse the silver salt particles and to help the emulsion layer adhere to a support. In the present invention, the binder may contain a water-insoluble or water-soluble polymer, and preferably contains a water-soluble polymer.

Examples of the binders include gelatins, polyvinyl alcohols (PVA), polyvinyl pyrolidones (PVP), polysaccharides such as starches, celluloses and derivatives thereof, polyethylene oxides, polysaccharides, polyvinylamines, chitosans, polylysines, polyacrylic acids, polyalginic acids, polyhyaluronic acids, and carboxycelluloses. The binders show a neutral, anionic, or cationic property depending on the ionicity of a functional group.

<Solvent>

The solvent used for forming the emulsion layer is not particularly limited, and examples thereof include water, organic solvents (e.g. alcohols such as methanol, ketones such as acetone, amides such as formamide, sulfoxides such as dimethyl sulfoxide, esters such as ethyl acetate, ethers), ionic liquids, and mixtures thereof.

In the present invention, the ratio of the solvent to the total of the silver salt, the binder, and the like in the emulsion layer is 30% to 90% by mass, preferably 50% to 80% by mass.

The treatments for forming the conductive film will be described below.

[Exposure]

In this embodiment, though the mesh pattern 22 may be formed by a printing process, it is formed by the exposure and development treatments, etc. in another process. A photosensitive material having the transparent film substrate 16 and thereon the silver salt-containing layer formed thereon or a photosensitive material coated with a photopolymer for photolithography is subjected to the exposure treatment. An electromagnetic wave may be used in the exposure. For example, the electromagnetic wave may be a light such as a visible light or an ultraviolet light, or a radiation ray such as an X-ray. The exposure may be carried out using a light source having a wavelength distribution or a specific wavelength.

[Development Treatment]

In this embodiment, the emulsion layer is subjected to the development treatment after the exposure. Common development treatment technologies for photographic silver salt films, photographic papers, print engraving films, emulsion masks for photomasking, and the like may be used in the present invention. A developer for the development treatment is not particularly limited, and may be a PQ developer, an MQ developer, an MAA developer, etc. Examples of commercially available developers usable in the present invention include CN-16, CR-56, CP45X, FD-3, and PAPITOL available from FUJIFILM Corporation, C-41, E-6, RA-4, D-19, and D-72 available from Eastman Kodak Company, and developers contained in kits thereof. The developer may be a lith developer.

In the present invention, the development process may include a fixation treatment for removing the silver salt in the unexposed area to stabilize the material. Fixation treatment technologies for photographic silver salt films, photographic papers, print engraving films, emulsion masks for photomasking, and the like may be used in the present invention.

In the fixation treatment, the fixation temperature is preferably about 20° C. to 50° C., more preferably 25° C. to 45° C. The fixation time is preferably 5 seconds to 1 minute, more preferably 7 to 50 seconds. The amount of the fixer is preferably 600 ml/m$^2$ or less, more preferably 500 ml/m$^2$ or less, particularly preferably 300 ml/m$^2$ or less, per 1 m$^2$ of the photosensitive material to be treated.

The developed and fixed photosensitive material is preferably subjected to a water washing treatment or a stabilization treatment. The amount of water used in the water washing or stabilization treatment is generally 20 L or less, and may be 3 L or less, per 1 m$^2$ of the photosensitive material. The photosensitive material may be washed with storage water, and thus the water amount may be 0.

The ratio of the metallic silver contained in the exposed area after the development to the silver contained in this area before the exposure is preferably 50% or more, more preferably 80% or more by mass. When the ratio is 50% or more by mass, a high conductivity can be achieved.

In this embodiment, the tone (gradation) obtained by the development is preferably more than 4.0, though not particularly restrictive. When the tone is more than 4.0 after the development, the conductivity of the conductive metal portion can be increased while maintaining high transmittance of the light-transmitting portion. For example, the tone of 4.0 or more can be achieved by doping with rhodium or iridium ion.

[Physical Development and Plating Treatment]

In this embodiment, to increase the conductivity of the metallic silver portion formed by the above exposure and development treatments, conductive metal particles may be deposited thereon by a physical development treatment and/or a plating treatment. In the present invention, the conductive metal particles may be deposited on the metallic silver portion by only one of the physical development and plating treatments or by the combination of the treatments. The metallic silver portion, subjected to the physical development treatment and/or the plating treatment in this manner, is referred to as the conductive metal portion.

In this embodiment, the physical development is such a process that metal ions such as silver ions are reduced by a reducing agent, whereby metal particles are deposited on a metal or metal compound core. Such physical development has been used in the fields of instant B & W film, instant slide film, printing plate production, etc., and the technologies can be used in the present invention.

The physical development may be carried out at the same time as the above development treatment after the exposure, and may be carried out after the development treatment separately.

In this embodiment, the plating treatment may contain electroless plating (such as chemical reduction plating or displacement plating), electrolytic plating, or a combination thereof. Known electroless plating technologies for printed circuit boards, etc. may be used in this embodiment. The electroless plating is preferably electroless copper plating.

[Oxidation Treatment]

In this embodiment, the metallic silver portion formed by the development treatment or the conductive metal portion formed by the physical development treatment and/or the plating treatment is preferably subjected to an oxidation treatment. For example, by the oxidation treatment, a small amount of a metal deposited on the light-transmitting portion can be removed, so that the transmittance of the light-transmitting portion can be increased to approximately 100%.

[Conductive Metal Portion]

In this embodiment, the line width of the conductive metal portion may be selected within a range of 5 m to 200 µm (0.2 mm). In the case of using the conductive metal portion for a transparent heating element, the portion may have a part with a line width of more than 20 µm for the purpose of ground connection, etc.

The line width is preferably 5 to 50 µm, more preferably 5 to 30 µm, most preferably 10 to 25 µm. The line distance is preferably 50 to 500 µm, more preferably 200 to 400 µm, most preferably 250 to 350 µm.

In this embodiment, the opening ratio of the conductive metal portion is preferably 85% or more, more preferably 90% or more, most preferably 95% or more, in view of the visible light transmittance. The opening ratio is the ratio of the light-transmitting portions other than the metal portions in the mesh pattern 22 to the whole. For example, a square lattice mesh having a line width of 15 µm and a pitch of 300 µm has an opening ratio of 90%.

[Light-Transmitting Portion]

In this embodiment, the light-transmitting portion is a portion having light transmittance, other than the conductive metal portions in the conductive film 10. The transmittance of the light-transmitting portion, which is herein a minimum transmittance value in a wavelength region of 380 to 780 nm obtained neglecting the light absorption and reflection of the transparent film substrate 16, is 90% or more, preferably 95% or more, more preferably 97% or more, further preferably 98% or more, most preferably 99% or more.

In this embodiment, it is preferred that the mesh pattern 22 has a continuous structure with a length of 3 m or more from the viewpoint of maintaining a high productivity of the conductive film 10. As the length of the continuous structure of the mesh pattern 22 is increased, this effect is further improved. Thus, in this case, the production loss of a transparent heating element can be advantageously reduced. The long roll of the mesh pattern 22, which contains the conductive portions 12 formed in the wavy line shape having at least one curve between the intersections 24, may be printing-exposed by a surface exposure method of irradiating the roll with a uniform light through a patterned mask or a scanning exposure method of irradiating the roll with a laser beam while transporting.

When an excessively large number of grids of the mesh pattern 22 (the mesh shapes M) are continuously printed, the roll of the mesh pattern 22 is disadvantageous in large diameter, heavy weight, and that high pressure is applied to the roll center to cause adhesion or deformation, etc. Therefore, the length of the mesh pattern 22 is preferably 2000 m or less. The length is preferably 3 m or more, more preferably 100 to 1000 m, further preferably 200 to 800 m, most preferably 300 to 500 m.

The thickness of the transparent film substrate 16 may be selected for example within a range of 0.01 to 2.0 mm. In view of the above described weight increase, adhesion, deformation, etc. caused in the roll, the thickness of the transparent film substrate 16 is preferably 200 μm or less, more preferably 20 to 180 μm, most preferably 50 to 120 μm.

In this embodiment, for example, in the first conductive film 10A shown in FIG. 1, it is preferred that an imaginary line connecting the intersections 24 of the first thin metal wire 12a is parallel to the adjacent imaginary line within an error of plus or minus 2°.

The scanning exposure with the optical beam is preferably carried out using light sources arranged on a line in a direction substantially perpendicular to the transporting direction, or using a rotary polygon mirror. In this case, the optical beam has to undergo binary or more intensity modulation, and dots are continuously formed into a line pattern. Because each fine wire is composed of the continuous dots, a fine 1-dot wire has a steplike edge shape. The width of each fine wire is a length in the narrowest part.

In this embodiment, the mesh pattern 22 is tilted preferably at 30° to 60°, more preferably at 40° to 50°, most preferably at 43° to 47°, against the transporting direction. In general, it is difficult to prepare a mask for forming a mesh pattern tilted at about 45° against the frame, and this is likely to result in uneven pattern, increased cost, etc. In contrast, in the above method according to the present invention, the pattern unevenness is reduced at the tilt angle of around 45°. Thus, the method of the embodiment is more effective as compared with patterning methods using masking exposure photolithography or screen printing.

[Conductive Film]

In the conductive film 10 of this embodiment, the thickness of the transparent film substrate 16 may be selected within a range of 0.01 to 2.0 mm as described above. The thickness is preferably 5 to 200 μm, more preferably 30 to 150 μm. When the thickness is 5 to 200 μm, a desired visible light transmittance can be obtained, and the transparent film substrate 16 can be easily handled.

The thickness of the metallic silver portion 36 formed on the support before the physical development treatment and/or the plating treatment may be appropriately selected by controlling the thickness of the coating liquid for the silver salt-containing layer applied to the transparent film substrate 16. The thickness of the metallic silver portion 36 may be selected within a range of 0.001 to 0.2 mm, and is preferably 30 μm or less, more preferably 20 μm or less, further preferably 0.01 to 9 μm, most preferably 0.05 to 5 μm. The metallic silver portion 36 is preferably formed in a patterned shape. The metallic silver portion 36 may have a monolayer structure or a multilayer structure containing two or more layers. In a case where the metallic silver portion 36 has a patterned multilayer structure containing two or more layers, the layers may have different wavelength color sensitivities. In this case, different patterns can be formed in the layers by using exposure lights with different wavelengths.

In the case of using the conductive film 10 in a transparent heating element, the conductive metal portion preferably has a smaller thickness. As the thickness is reduced, the viewing angle of a window glass using the element is increased, and the heat generation efficiency is improved. Thus, the thickness of the layer of the conductive metal 40 on the conductive metal portion is preferably less than 9 μm, more preferably 0.1 μm or more but less than 5 μm, further preferably 0.1 μm or more but less than 3 μm.

In this embodiment, the thickness of the metallic silver portion 36 can be controlled by changing the coating thickness of the silver salt-containing layer, and the thickness of the conductive metal particle layer can be controlled in the physical development and/or the plating treatment, whereby the conductive film 10 having a thickness of less than 5 μm (preferably less than 3 μm) can be easily produced.

In conventional etching methods, most of a thin metal film must be removed and discarded by etching. In contrast, in this embodiment, the pattern containing only a minimal amount of the conductive metal can be formed on the transparent film substrate 16. Thus, only the minimal amount of the metal is required, so that production costs and metal waste amount can be advantageously reduced.

<Adhesive Layer>

The conductive film 10 of the embodiment may be bonded to a window glass, etc. by an adhesive layer. The adhesive layer preferably contains an adhesive having a refractive index of 1.40 to 1.70. This is because visible light transmittance deterioration can be prevented by reducing the refractive index difference between the adhesive and the transparent substrate such as the plastic film. When the adhesive has a refractive index of 1.40 to 1.70, the visible light transmittance deterioration can be advantageously reduced.

EXAMPLES

The present invention will be described more specifically below with reference to Examples 1 and 2. Materials, amounts, ratios, treatment contents, treatment procedures, and the like, used in Examples 1 and 2, may be appropriately changed without departing from the scope of the present invention. The following specific examples are therefore to be considered in all respects as illustrative and not restrictive.

(Photosensitive Silver Halide Material: Examples 1 and 2)

An emulsion containing an aqueous medium, a gelatin, and silver iodobromochloride particles was prepared. The amount of the gelatin was 10.0 g per 60 g of Ag, and the silver iodobromochloride particles had an I content of 0.2 moil, a Br content of 40 moil, and an average spherical equivalent diameter of 0.1 μm.

K3Rh2Br9 and K2IrCl6 were added to the emulsion at a concentration of $10^{-7}$ mol/mol-silver to dope the silver bromide particles with Rh and Ir ions. Na2PdCl4 was further added to the emulsion, and the resultant emulsion was subjected to gold-sulfur sensitization using chlorauric acid and sodium thiosulfate. The emulsion and a gelatin hardening agent were applied to a polyethylene terephthalate (PET) such that the amount of the applied silver was 1 g/m². The Ag/gelatin volume ratio was 1/2.

The PET support had a width of 30 cm, and the emulsion was applied thereto into a width of 25 cm and a length of 20 m. The both end portions having a width of 3 cm of the PET support were cut off to obtain a roll photosensitive silver halide material having a width of 24 cm.

(Exposure)

The photosensitive silver halide material was exposed by using a continuous exposure apparatus. In the apparatus, exposure heads using a DMD (a digital mirror device) according to an embodiment of Japanese Laid-Open Patent Publication No. 2004-1244 were arranged into a width of 25 cm. The exposure heads and exposure stages were arranged on a curved line to concentrate laser lights onto the photosensitive layer of the photosensitive material. Further, in the apparatus, a feeding mechanism and a winding mechanism for the photosensitive material were disposed, and a buffering bend was formed such that the speed in the exposure part was not affected by change of the exposure surface tension, and feeding and winding speeds. The light for the exposure had a wavelength of 400 nm and a beam shape of approximately 12-μm square, and the output of the laser light source was 100 μJ.

The photosensitive material was exposed continuously in a pattern shown in Table 1 with a width of 24 cm and a length of 10 m. The exposure was carried out under the following conditions to print a mesh pattern 22. The periods of wavy line shapes between intersections 24 in the mesh pattern 22, the first pitch L1 (the pitch of first thin metal wires 12a), the second pitch L2 (the pitch of second thin metal wires 12b) are shown in Table 1.

The mesh pattern 22 was formed on the photosensitive layer by an exposure method using two exposure heads in combination.

By using the first exposure head, the photosensitive layer is irradiated with a constant laser beam while reciprocating the beam in the direction perpendicular to the direction of transporting the layer, to draw an exposure pattern (for forming the first thin metal wires 12a) on the layer. Thus, the pattern is drawn by the beam at a tilt angle of 45° in accordance with the ratio of the photosensitive layer transporting speed and the head reciprocating speed in the perpendicular direction. After the beam reaches an end of the photosensitive layer, the pattern is drawn at the reversed angle depending on the reciprocal motion of the head.

Specifically, in Example 1, an exposure pattern for forming the first thin metal wires 12a shown in FIG. 1 was drawn. In Example 2, an exposure pattern for forming the first thin metal wires 12a shown in FIG. 4 was drawn.

By using the second exposure head, in the same manner as in the first exposure head, the photosensitive layer is irradiated with a constant laser beam while reciprocating the beam in the direction perpendicular to the direction of transporting the layer, to draw an exposure pattern (for forming the second thin metal wires 12b) on the layer. The motion start point of the second exposure head is different from that of the first exposure head by 180 degrees or a multiple of 180 degrees. Thus, when the first exposure head is moved obliquely from one end of the photosensitive layer, the second exposure head is moved obliquely from the other end in the opposite direction, so that the mesh pattern 22 is formed.

Specifically, in Example 1, an exposure pattern for forming the second thin metal wires 12b shown in FIG. 1 was drawn. In Example 2, an exposure pattern for forming the second thin metal wires 12b shown in FIG. 4 was drawn.

| (Development treatment) | |
|---|---|
| Formulation of 1 L of developer | |
| Hydroquinone | 20 g |
| Sodium sulfite | 50 g |
| Potassium carbonate | 40 g |
| Ethylenediaminetetraacetic acid | 2 g |
| Potassium bromide | 3 g |
| Polyethylene glycol 2000 | 1 g |
| Potassium hydroxide | 4 g |
| pH | Controlled at 10.3 |
| Formulation of 1 L of fixer | |
| Ammonium thiosulfate solution (75%) | 300 ml |
| Ammonium sulfite monohydrate | 25 g |
| 1,3-Diaminopropanetetraacetic acid | 8 g |
| Acetic acid | 5 g |
| Aqueous ammonia (27%) | 1 g |
| pH | Controlled at 6.2 |

The exposed photosensitive material was treated with the above treatment agents under the following conditions using an automatic processor FG-710PTS manufactured by FUJIFILM Corporation. A development treatment was carried out at 35° C. for 30 seconds, a fixation treatment was carried out at 34° C. for 23 seconds, and then a water washing treatment was carried out for 20 seconds at a water flow rate of 5 L/min.

The running conditions were such that the amount of the treated photosensitive material was 100 m²/day, the replenishment amount of the developer was 500 ml/m², the replenishment amount of the fixer was 640 ml/m², and the treatment period was 3 days. It was confirmed that a copper pattern had a line width of 12 μm and a pitch of 300 μm after a plating treatment.

The material was subjected to an electroless copper plating treatment at 45° C. using an electroless Cu plating solution having a pH of 12.5, containing 0.06 mol/L of copper sulfate, 0.22 mol/L of formalin, 0.12 mol/L of triethanolamine, 100 ppm of a polyethylene glycol, 50 ppm of yellow prussiate of potash, and 20 ppm of α,α'-bipyridine. The material was then subjected to an oxidation treatment using an aqueous solution containing 10 ppm of Fe (III) ion, to produce each conductive film sample.

As shown in Table 1, in Example 1 (see FIG. 1), one first thin metal wires 12a1 and one second thin metal wires 12b1 had 1 period of the wavy line shape between the intersections 24, the other first thin metal wires 12a2 and the other second thin metal wires 12b2 had 2 periods of the wavy line shape between the intersections 24, the first pitch L1 and the second pitch L2 were 400 μm, and the line width h of the conductive portions 12 was 18 μm. In Example 2 (see FIG. 4), one first thin metal wires 12a1 and one second thin metal wires 12b1 had 1 period of the wavy line shape between the intersections 24, the first pitch L1 and the second pitch L2 were 400 μm, and the line width h of the conductive portions 12 was 18 μm.

[Evaluation]

(Surface Resistance Measurement)

In each conductive film 10, the surface resistivity values of optionally selected 10 areas were measured by LORESTA GP (Model No. MCP-T610) manufactured by Dia Instruments Co., Ltd. utilizing an in-line four-probe method (ASP), and the average of the measured values was obtained to evaluate the surface resistivity uniformity.

(Glare Evaluation)

A transparent plate for supporting each conductive film 10 was composed of a glass with a thickness of 5 mm representing a window glass. The conductive film was attached to the transparent plate and placed in a dark room. A light was emitted from an incandescent lamp (40-watt bulb) placed at a distance of 3 m from the transparent plate. The light transmitted through the transparent plate was visually observed to evaluate the glare caused by interference of a diffracted light. The glare observation was carried out in a position at a distance of 1 m from the surface of the transparent plate (the surface on which the conductive film 10 was attached). When the glare was not observed, the sample was evaluated as Excellent. When the glare was slightly observed but acceptable, the sample was evaluated as Fair. When the glare was significantly observed, the sample was evaluated as Poor.

(Evaluation Result)

As shown in Table 1, in Examples 1 and 2, each sample had no significant glare, a low surface resistivity sufficient for practical use in a transparent heating element, and an excellent light transmittance. In addition, conductive films were produced in the same manner as in Example 1 except for using mesh patterns shown in FIGS. 14 and 23, respectively. Also, each of the conductive films had no significant glare, a low surface resistivity sufficient for practical use in a transparent heating element, and an excellent light transmittance.

TABLE 1

| | Period between intersections | First pitch L1 (μm) | Second pitch L2 (μm) | Glare | Surface resistivity (ohm/sq) | Total light transmittance (%) |
|---|---|---|---|---|---|---|
| Example 1 | 1 and 2 | 400 | 400 | Excellent | 0.3 | 80.1 |
| Example 2 | 1 and straight | 400 | 400 | Excellent | 0.3 | 81.2 |

It is to be understood that the conductive film and the transparent heating element of the present invention are not limited to the above embodiments, and various changes and modifications may be made therein without departing from the scope of the present invention.

The present invention may be appropriately combined with technologies described in the following patent publications: Japanese Laid-Open Patent Publication Nos. 2004-221564, 2004-221565, 2007-200922, and 2006-352073; International Patent Publication No. 2006/001461; Japanese Laid-Open Patent Publication Nos. 2007-129205, 2007-235115, 2007-207987, 2006-012935, 2006-010795, 2006-228469, 2006-332459, 2007-207987, and 2007-226215; International Patent Publication No. 2006/088059; Japanese Laid-Open Patent Publication Nos. 2006-261315, 2007-072171, 2007-102200, 2006-228473, 2006-269795, and 2006-267635; International Patent Publication No. 2006/098333; Japanese Laid-Open Patent Publication Nos. 2006-324203, 2006-228478, and 2006-228836; International Patent Publication Nos. 2006/098336 and 2006/098338; Japanese Laid-Open Patent Publication Nos. 2007-009326, 2006-336090, 2006-336099, 2006-348351, 2007-270321, and 2007-270322; International Patent Publication No. 2006/098335; Japanese Laid-Open Patent Publication Nos. 2007-201378 and 2007-335729; International Patent Publication No. 2006/098334; Japanese Laid-Open Patent Publication Nos. 2007-134439, 2007-149760, 2007-208133, 2007-178915, 2007-334325, 2007-310091, 2007-116137, 2007-088219, 2007-207883, and 2007-013130; International Patent Publication No. 2007/001008; and Japanese Laid-Open Patent Publication Nos. 2005-302508, 2008-218784, 2008-227350, 2008-227351, 2008-244067, 2008-267814, 2008-270405, 2008-277675, 2008-277676, 2008-282840, 2008-283029, 2008-288305, 2008-288419, 2008-300720, 2008-300721, 2009-4213, 2009-10001, 2009-16526, 2009-21334, 2009-26933, 2008-147507, 2008-159770, 2008-159771, 2008-171568, 2008-198388, 2008-218096, 2008-218264, 2008-224916, 2008-235224, 2008-235467, 2008-241987, 2008-251274, 2008-251275, 2008-252046, 2008-277428, and 2009-21153.

The invention claimed is:

1. A conductive film comprising a plurality of conductive portions and a plurality of opening portions, wherein a combination of the conductive portions and the opening portions has mesh shapes,
   the conductive portions are formed of a plurality of conductive thin metal wires in a mesh pattern having a plurality of lattice intersections,
   the mesh pattern is formed by crossing a plurality of first thin metal wires arranged in one direction and a plurality of second thin metal wires arranged in another direction, and
   some of the first thin metal wires are formed in wavy line shapes containing arcs extending in alternate directions, at least one of the arcs being disposed between the intersections, and
   the wavy line shapes of adjacent parallel first thin metal wires have different periods,
   wherein in an imaginary line connecting central points of adjacent two mesh shapes which share only a single intersection of the conductive portions, a length between the central point of one of the two adjacent mesh shapes and the shared intersection is equal to a length between the central point of another of the two adjacent mesh shapes and the shared intersection.

2. The conductive film according to claim 1, wherein the arcs have a central angle of 75° to 105°.

3. The conductive film according to claim 1, wherein the second thin metal wires are formed in wavy line shapes containing at least one curve between the intersections, and
   the wavy line shapes of adjacent parallel second thin metal wires have different periods.

4. The conductive film according to claim 1, wherein at least one of a pattern of the first thin metal wires and a pattern of the second thin metal wires is arranged such that one thin metal wire has a smallest arrangement period number of the arcs, and the arrangement period number of the arcs is increased stepwise from the one thin metal wire to another thin metal wire arranged in one direction.

5. The conductive film according to claim 1, wherein at least one of a pattern of the first thin metal wires and a pattern of the second thin metal wires is arranged such that two thin metal wires disposed adjacently on either side of a thin metal wire having a smallest arrangement period number of the arcs have approximately the same arrangement period numbers of the arcs, and two thin metal wires disposed adjacently on either side of a thin metal wire having a largest arrangement period number of the arcs have approximately the same arrangement period numbers of the arcs.

6. The conductive film according to claim 1, wherein the conductive portions have a crossing angle of approximately 90° in the intersections.

7. The conductive film according to claim 1, wherein the conductive portions contain a metallic silver portion formed by exposing and developing a photosensitive silver salt layer disposed on a transparent support.

8. A conductive film comprising a plurality of conductive portions and a plurality of opening portions,
   wherein a combination of the conductive portions and the opening portions has mesh shapes,
   the conductive portions are formed of a plurality of conductive thin metal wires in a mesh pattern having a plurality of lattice intersections,
   the mesh pattern is formed by crossing a plurality of first thin metal wires arranged in one direction and a plurality of second thin metal wires arranged in another direction,
   some of the first thin metal wires are formed in a wavy line shape containing arcs extending in alternate directions, at least one of the arcs being disposed between the intersections, and
   among adjacent parallel first thin metal wires, one first thin metal wire is formed in a straight line shape,
   wherein in an imaginary line connecting central points of adjacent two mesh shapes which share only a single intersection of the conductive portions, a length between the central point of one of the two adjacent mesh shapes and the shared intersection is equal to a length between the central point of another of the two adjacent mesh shapes and the shared intersection.

9. The conductive film according to claim 8, wherein the arcs have a central angle of 75° to 105°.

10. The conductive film according to claim 8, wherein among adjacent parallel second thin metal wires, one second thin metal wire is formed in a straight line shape, and the other second thin metal wire is formed in a wavy line shape containing at least one curve between the intersections.

11. The conductive film according to claim 8, wherein at least one of a pattern of the first thin metal wires and a pattern of the second thin metal wires is arranged such that one thin metal wire has a smallest arrangement period number of the arcs, and the arrangement period number of the arcs is increased stepwise from the one thin metal wire to another thin metal wire arranged in one direction.

12. The conductive film according to claim 8, wherein at least one of a pattern of the first thin metal wires and a pattern of the second thin metal wires is arranged such that two thin metal wires disposed adjacently on either side of a thin metal wire having a smallest arrangement period number of the arcs have approximately the same arrangement period numbers of the arcs, and two thin metal wires disposed adjacently on either side of a thin metal wire having a largest arrangement period number of the arcs have approximately the same arrangement period numbers of the arcs.

13. The conductive film according to claim 8, wherein the conductive portions have a crossing angle of approximately 90° in the intersections.

14. The conductive film according to claim 8, wherein the conductive portions contain a metallic silver portion formed by exposing and developing a photosensitive silver salt layer disposed on a transparent support.

15. A conductive film comprising a plurality of conductive portions and a plurality of opening portions, wherein a combination of the conductive portions and the opening portions has mesh shapes,
   the conductive portions are formed of a plurality of conductive thin metal wires in a mesh pattern having a plurality of lattice intersections,
   the mesh pattern is formed by crossing a plurality of first thin metal wires arranged in one direction and a plurality of second thin metal wires arranged in another direction, and
   some of the first thin metal wires are formed in wavy line shapes containing arcs extending in alternate directions, at least one of the arcs being disposed between the intersections, and
   the wavy line shapes of adjacent parallel first thin metal wires have different periods,
   wherein a length of a straight imaginary line connecting central points of adjacent two mesh shapes, which share one side of the mesh shapes, is equally divided by a shared side.

16. The conductive film according to claim 15, wherein the arcs have a central angle of 75° to 105°.

17. The conductive film according to claim 15, wherein the second thin metal wires are formed in wavy line shapes containing at least one curve between the intersections, and
   the wavy line shapes of adjacent parallel second thin metal wires have different periods.

18. The conductive film according to claim 15, wherein at least one of a pattern of the first thin metal wires and a pattern of the second thin metal wires is arranged such that one thin metal wire has a smallest arrangement period number of the arcs, and the arrangement period number of the arcs is increased stepwise from the one thin metal wire to another thin metal wire arranged in one direction.

19. The conductive film according to claim 15, wherein at least one of a pattern of the first thin metal wires and a pattern of the second thin metal wires is arranged such that two thin metal wires disposed adjacently on either side of a thin metal wire having a smallest arrangement period number of the arcs have approximately the same arrangement period numbers of the arcs, and two thin metal wires disposed adjacently on either side of a thin metal wire having a largest arrangement period number of the arcs have approximately the same arrangement period numbers of the arcs.

20. The conductive film according to claim 15, wherein the conductive portions have a crossing angle of approximately 90° in the intersections.

21. The conductive film according to claim 15, wherein the conductive portions contain a metallic silver portion formed by exposing and developing a photosensitive silver salt layer disposed on a transparent support.

22. A conductive film comprising a plurality of conductive portions and a plurality of opening portions,
   wherein a combination of the conductive portions and the opening portions has mesh shapes,
   the conductive portions are formed of a plurality of conductive thin metal wires in a mesh pattern having a plurality of lattice intersections,
   the mesh pattern is formed by crossing a plurality of first thin metal wires arranged in one direction and a plurality of second thin metal wires arranged in another direction,
   some of the first thin metal wires are formed in a wavy line shape containing arcs extending in alternate directions, at least one of the arcs being disposed between the intersections, and
   among adjacent parallel first thin metal wires, one first thin metal wire is formed in a straight line shape,
   wherein a length of a straight imaginary line connecting central points of adjacent two mesh shapes, which share one side of the mesh shapes, is equally divided by the shared side.

23. The conductive film according to claim 22, wherein the arcs have a central angle of 75° to 105°.

24. The conductive film according to claim 22, wherein among adjacent parallel second thin metal wires, one second thin metal wire is formed in a straight line shape, and the other second thin metal wire is formed in a wavy line shape containing at least one curve between the intersections.

25. The conductive film according to claim 22, wherein at least one of a pattern of the first thin metal wires and a pattern of the second thin metal wires is arranged such that one thin metal wire has a smallest arrangement period number of the arcs, and the arrangement period number of the arcs is increased stepwise from the one thin metal wire to another thin metal wire arranged in one direction.

26. The conductive film according to claim 22, wherein at least one of a pattern of the first thin metal wires and a pattern of the second thin metal wires is arranged such that two thin metal wires disposed adjacently on either side of a thin metal wire having a smallest arrangement period number of the arcs have approximately the same arrangement period numbers of the arcs, and two thin metal wires disposed adjacently on either side of a thin metal wire having a largest arrangement period number of the arcs have approximately the same arrangement period numbers of the arcs.

27. The conductive film according to claim 22, wherein the conductive portions have a crossing angle of approximately 90° in the intersections.

28. The conductive film according to claim 22, wherein the conductive portions contain a metallic silver portion formed by exposing and developing a photosensitive silver salt layer disposed on a transparent support.

* * * * *